United States Patent [19]
Noll et al.

[11] Patent Number: 5,803,502
[45] Date of Patent: Sep. 8, 1998

[54] METHOD AND STRUCTURE FOR PROPERLY POSITIONING FREIGHT IN A TRAILER, CONTAINER OR OTHER FREIGHT RECEPTACLE

[76] Inventors: Virginia Noll; Charles Noll, both of 5937 Kunesh Rd., Pulaski, Wis. 54162

[21] Appl. No.: 362,889

[22] Filed: Dec. 23, 1994

[51] Int. Cl.⁶ .............................. B42D 15/00; G01B 3/10; G01B 3/02
[52] U.S. Cl. ........................... 283/79; 283/114; 283/100; 283/101; 283/81; 33/758
[58] Field of Search .............................. 283/79, 114, 101, 283/100, 81; 33/1 G, 15 D, 758, 494, 759, 760, 771; 177/1

[56] References Cited

U.S. PATENT DOCUMENTS

| | | |
|---|---|---|
| 4,166,318 | 9/1979 | Engstrom .................................... 33/1 G |
| 4,351,113 | 9/1982 | Eggertsen et al. ......................... 33/758 |
| 4,516,116 | 5/1985 | White . |
| 4,605,081 | 8/1986 | Helmly, Jr. et al. . |
| 4,714,121 | 12/1987 | Kroll et al. . |
| 4,725,156 | 2/1988 | Proulx et al. . |
| 4,775,018 | 10/1988 | Kroll et al. . |
| 4,813,504 | 3/1989 | Kroll . |
| 4,821,889 | 4/1989 | Cohen . |
| 5,167,289 | 12/1992 | Stevenson . |
| 5,496,070 | 3/1996 | Thompson ................................... 283/2 |

Primary Examiner—Frances Han
Attorney, Agent, or Firm—Birch, Stewart, Kolasch & Birch, LLP

[57] ABSTRACT

A method and apparatus for achieving accurate positioning of freight in a freight receptacle, without requiring skill on the part of the material handling equipment operator. The method and apparatus uses specially marked forms, a Freight Placement Index, and can be used in conjunction with a computer software program, computer, and a scale/scanner. The computer program identifies the correct load position, with respect to the Freight Placement Index inside the freight container after the load description has been entered into the computer. The scanner/scale enter the height, width, length, and weight of load materials. One method is for the load planner or material handling equipment, operator to input information about freight i.e. by use of a computer program and the scale/scanner unit. This program instructs the operator to position the load respective to the Freight Placement Index inside of the freight container or receptacle. With this invention, the computer calculates and adjusts the position of the freight, eliminating the need for time consuming loading, weighing, readjustment of freight and repositioning as well as highly skilled load planners or material handling equipment operators.

19 Claims, 30 Drawing Sheets

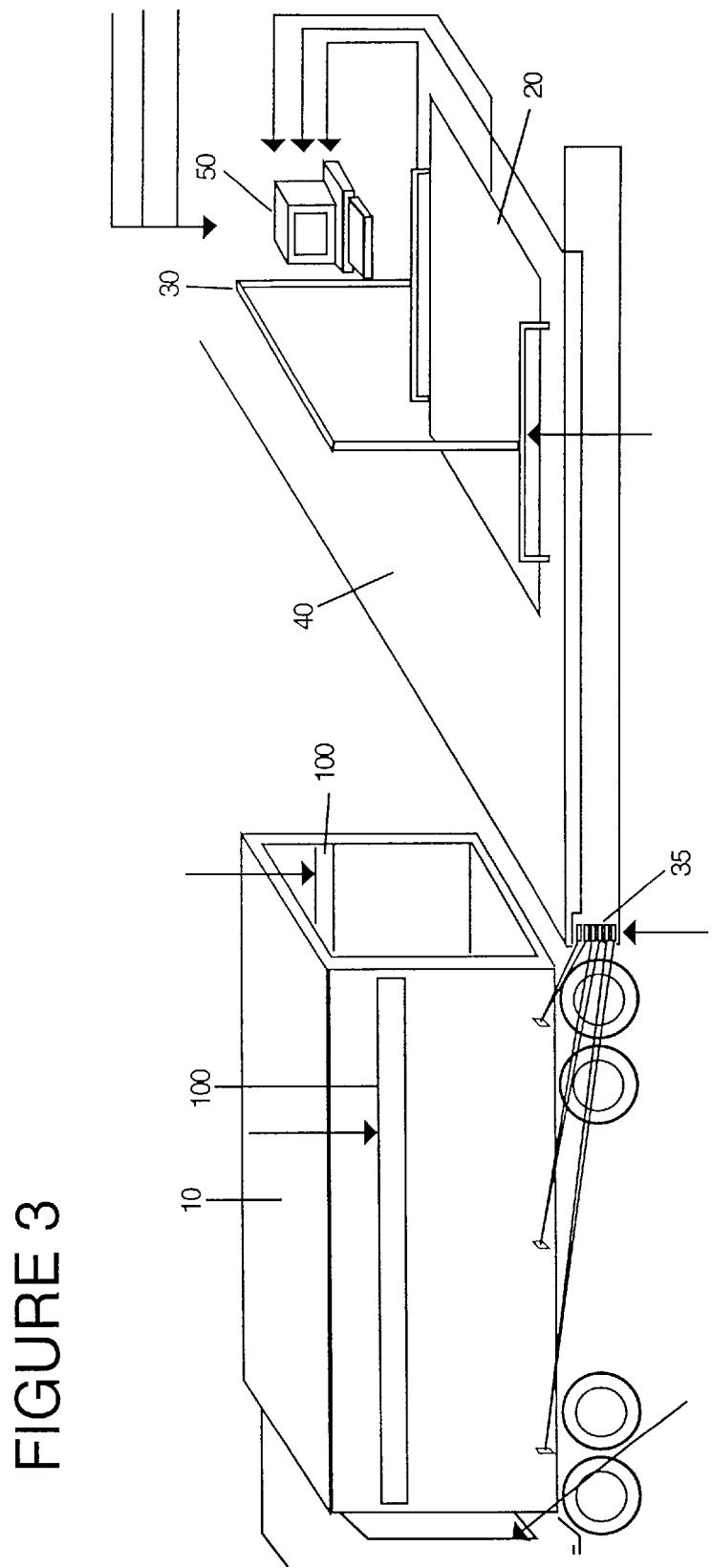

| 1 2 3 | 4 5 6 | 7 8 9 | 10 11 12 | 13 14 15 | 16 17 18 | 19 20 21 | 22 23 24 | 25 26 27 | 28 29 30 |
|---|---|---|---|---|---|---|---|---|---|
| BRT. RED | WARM RED | RED ORANGE | ORANGE | BRT. ORAN. | ORAN. BLUE | BLUE | BL. GR. | GREEN | BRT. GR. |
| 1 - 3 | 4 - 6 | 7 - 9 | 10 - 12 | 13 - 15 | 16 - 18 | 19 - 21 | 22 - 24 | 25 - 27 | 28 - 30 |
| 8500 #<br>ZZ - 10 | 8500#<br>ZZ - 9 | 4000 #<br>ZZ - 8 | 4000 #<br>ZZ - 2 | 4000 #<br>ZZ - 4 | 4000 #<br>ZZ - 3 | 4000 #<br>ZZ - 1 | 4000 #<br>ZZ - 5 | 8500#<br>ZZ - 7 | 8500#<br>ZZ - 6 |

| | | | | | | |
|---|---|---|---|---|---|---|
| 36 | Exception { | 66,000 | 70,500 | 75,500 | 81000 | 86,500 | 92,000 |
| 37 | | 66,500 | 71,000 | 76,000 | 81,500 | 87,000 | 93,000 |
| 38 | | 67,500 | 71,500 | 77,000 | 82,000 | 87,500 | 93,500 |
| 39 | | 68,000 | 72,500 | 77,500 | 82,500 | 88,500 | 94,000 |
| 40 | | 68,500 | 73,000 | 78,000 | 83,000 | 89,000 | 94,500 |
| 41 | | 69,500 | 73,500 | 78,500 | 84,000 | 89,500 | 95,000 |
| 42 | | 70,000 | 74,000 | 79,000 | 84,500 | 90,000 | 95,500 |
| 43 | | 70,500 | 75,000 | 80,000 | 85,000 | 90,500 | 96,000 |
| 44 | | 71,500 | 75,500 | 80,500 | 85,500 | 91,000 | 96,500 |
| 45 | | 72,000 | 76,000 | 81,000 | 86,000 | 91,500 | 97,500 |
| 46 | | 72,500 | 76,500 | 81,500 | 87,000 | 92,500 | 98,000 |
| 47 | | 73,500 | 77,500 | 82,000 | 87,500 | 93,000 | 98,500 |
| 48 | | 74,000 | 78,000 | 83,000 | 88,000 | 93,500 | 99,000 |
| 49 | | 74,500 | 78,500 | 83,500 | 88,500 | 94,000 | 99,500 |
| 50 | | 75,500 | 79,000 | 84,000 | 89,000 | 94,500 | 100,000 |
| 51 | | 76,000 | 80,000 | 84,500 | 89,500 | 95,000 | 100,500 |
| 52 | | 76,500 | 80,500 | 85,000 | 90,500 | 95,500 | 101,000 |
| 53 | | 77,500 | 81,000 | 86,000 | 91,000 | 96,500 | 102,000 |
| 54 | | 78,000 | 81,500 | 86,500 | 91,500 | 97,000 | 102,500 |
| 55 | | 78,500 | 82,500 | 87,000 | 92,000 | 97,500 | 103,000 |
| 56 | Interstate Gross } | 79,500 | 83,000 | 87,500 | 92,500 | 98,000 | 103,500 |
| 57 | Weight Limit | 80,000 | 83,500 | 88,000 | 93,000 | 98,500 | 104,000 |
| 58 | | | 84,000 | 89,000 | 94,000 | 99,000 | 104,500 |
| 59 | | | 85,000 | 98,500 | 94,500 | 99,500 | 105,000 |
| 60 | | | 85,500 | 90,000 | 95,000 | 100,500 | 105,500 |

1. The permissible loads are computed to the nearest 500 pounds. The modification consists in limiting the maximum load on any single axle to 20,000 pounds.

2. The following loaded vehicles must not operate over H15-44 bridges : 3-52 ( 5 axles ) with wheelbase less than 38 feet: 2-51-2 ( 5 axles ) with wheelbase less than 45 feet: 3-3 ( 6 axles ) with wheelbase less than 45 feet: and 7, 8, and 9 axle vehicles regardless of wheelbase.

FIGURE 14A

FEDERAL
Permissible gross loads for vehicles in regular operation

Based on the weight formula $W = 500 \left( \dfrac{LN}{N-1} + 12N + 36 \right)$ modified [1]

Distance in feet between the extremes of any group of 2 or more consecutive axles (Bridge table B) [2]
Maximum load in pounds of any group of 2 or more consecutive axles

| | 2 axles | 3 axles | 4 axles | 5 axles | 6 axles | 7 axles | 8 axles | 9 axles |
|---|---|---|---|---|---|---|---|---|
| Tandem Axle Weight { 4 | 34,000 | | | | | | | |
| 5 | 34,000 | | | | | | | |
| 6 | 34,000 | | | | | | | |
| 7 | 34,000 | | | | | | | |
| 8 and less | 34,000 | 34,000 | | | | | | |
| More than 8 | 38,000 | 42,000 | | | | | | |
| 9 | 39,000 | 42,500 | | | | | | |
| 10 | 40,000 | 43,500 | | | | | | |
| 11 | | 44,000 | | | | | | |
| 12 | | 45,000 | 50,000 | | | | | |
| 13 | | 45,500 | 50,500 | | | | | |
| 14 | | 46,500 | 51,500 | | | | | |
| 15 | | 47,000 | 52,000 | | | | | |
| 16 | | 48,000 | 52,500 | 58,000 | | | | |
| 17 | | 48,500 | 53,500 | 58,500 | | | | |
| 18 | | 49,500 | 54,000 | 59,000 | | | | |
| 19 | | 50,000 | 54,500 | 60,000 | | | | |
| 20 | | 51,000 | 55,500 | 60,500 | 66,000 | | | |
| 21 — EXAMPLE → | | 51,500 | 56,000 | 61,000 | 66,500 | | | |
| 22 | | 52,500 | 56,500 | 61,500 | 67,000 | | | |
| 23 | | 53,000 | 57,500 | 62,500 | 68,000 | | | |
| 24 | | 54,000 | 58,000 | 63,000 | 68,500 | 74,000 | | |
| 25 | | 54,500 | 58,500 | 63,500 | 69,000 | 74,500 | | |
| 26 | | 55,500 | 59,500 | 64,000 | 69,500 | 75,000 | | |
| 27 | | 56,000 | 60,000 | 65,000 | 70,000 | 75,500 | | |
| 28 | | 57,000 | 61,500 | 66,000 | 71,000 | 76,500 | 82,000 | |
| 29 | | 57,500 | 61,500 | 66,000 | 71,500 | 77,000 | 82,500 | |
| 30 | | 58,500 | 62,000 | 66,500 | 77,500 | 77,500 | 83,000 | |
| 31 | | 59,000 | 62,500 | 67,500 | 72,000 | 78,000 | 83,500 | |
| 32 | | 60,000 | 63,500 | 68,000 | 73,000 | 78,500 | 84,500 | 90,000 |
| 33 | | | 64,000 | 68,500 | 74,000 | 79,000 | 85,000 | 90,500 |
| 34 | | | 64,500 | 69,000 | 74,500 | 80,000 | 85,500 | 91,000 |
| 35 | | | 65,500 | 70,000 | 75,000 | 80,500 | 86,000 | 91,500 |

Figure 14 continued on the next page

FIGURE 14B

| | | | | | | |
|---|---|---|---|---|---|---|
| 36----------------- | (66,000) | 70,500 | 75,500 | 81000 | 86,500 | 92,000 |
| 37----------------- Exception | 66,500 | 71,000 | 76,000 | 81,500 | 87,000 | 93,000 |
| 38----------------- | (67,500) | 71,500 | 77,000 | 82,000 | 87,500 | 93,500 |
| 39----------------------------- | 68,000 | 72,500 | 77,500 | 82,500 | 88,500 | 94,000 |
| 40----------------------------- | 68,500 | 73,000 | 78,000 | 83,000 | 89,000 | 94,500 |
| 41----------------------------- | 69,500 | 73,500 | 78,500 | 84,000 | 89,500 | 95,000 |
| 42----------------------------- | 70,000 | 74,000 | 79,000 | 84,500 | 90,000 | 95,500 |
| 43----------------------------- | 70,500 | 75,000 | 80,000 | 85,000 | 90,500 | 96,000 |
| 44----------------------------- | 71,500 | 75,500 | 80,500 | 85,500 | 91,000 | 96,500 |
| 45----------------------------- | 72,000 | 76,000 | 81,000 | 86,000 | 91,500 | 97,500 |
| 46----------------------------- | 72,500 | 76,500 | 81,500 | 87,000 | 92,500 | 98,000 |
| 47----------------------------- | 73,500 | 77,500 | 82,000 | 87,500 | 93,000 | 98,500 |
| 48----------------------------- | 74,000 | 78,000 | 83,000 | 88,000 | 93,500 | 99,000 |
| 49----------------------------- | 74,500 | 78,500 | 83,500 | 88,500 | 94,000 | 99,500 |
| 50----------------------------- | 75,500 | 79,000 | 84,000 | 89,000 | 94,500 | 100,000 |
| 51----------------------------- | 76,000 | 80,000 | 84,500 | 89,500 | 95,000 | 100,500 |
| 52----------------------------- | 76,500 | 80,500 | 85,000 | 90,500 | 95,500 | 101,000 |
| 53----------------------------- | 77,500 | 81,000 | 86,000 | 91,000 | 96,500 | 102,000 |
| 54----------------------------- | 78,000 | 81,500 | 86,500 | 91,500 | 97,000 | 102,500 |
| 55----------------------------- | 78,500 | 82,500 | 87,000 | 92,000 | 97,500 | 103,000 |
| 56---------- Interstate Gross | 79,500 | 83,000 | 87,500 | 92,500 | 98,000 | 103,500 |
| 57---------- Weight Limit | 80,000 | 83,500 | 88,000 | 93,000 | 98,500 | 104,000 |
| 58------------ | ---------- 84,000 | 89,000 | 94,000 | 99,000 | 104,500 | |
| 59----------------------------- | 85,000 | 98,500 | 94,500 | 99,500 | 105,000 | |
| 60----------------------------- | 85,500 | 90,000 | 95,000 | 100,500 | 105,500 | |

1. The permissible loads are computed to the nearest 500 pounds. The modification consists in limiting the maximum load on any single axle to 20,000 pounds.

2. The following loaded vehicles must not operate over H15-44 bridges : 3-52 ( 5 axles ) with wheelbase less than 38 feet: 2-51-2 ( 5 axles ) with wheelbase less than 45 feet: 3-3 ( 6 axles ) with wheelbase less than 45 feet: and 7, 8, and 9 axle vehicles regardless of wheelbase.

FIGURE 15

SOUTH CAROLINA

VEHICLE SIZES AND WEIGHTS

Permitted Vehicle Limitations.

The following are the maximum weights allowed under permit:

| | |
|---|---:|
| (1) Two-axle single unit vehicle | 40,000 lbs. |
| (2) Three-axle single unit vehicle | 50,000 lbs. |
| (3) Four-axle single unit vehicle | 65,000 lbs |
| (4) Combination of vehicles with three axles | 50,000 lbs |
| (5) Combination of vehicles with four axles | 70,000 lbs |
| (6) Combination of vehicles with five axles | 90,000 lbs |
| (7) Combination of vehicles with six axles | 105,000 lbs |
| (8) Combination of vehicles with seven or more axles | 120,000 lbs |

Overall Tandem Weights allowed under permit:

| | |
|---|---:|
| (1) Two-axle tandem | 40,000 lbs |
| (2) Three-axle tandem | 55,000 lbs |
| (3) Four-axle tandem | 55,000 lbs |

Requests for these maximum limits must be submitted with the appropriate drawings, pictures, and the reasons for the move well in advance of the proposed move.

METHOD AND STRUCTURE FOR PROPERLY POSITIONING FREIGHT IN A TRAILER, CONTAINER OR OTHER FREIGHT RECEPTACLE

BACKGROUND OF THE INVENTION

1. Field of the Invention

The present invention relates to properly aligning and positioning freight inside a trailer, container or other freight receptacle. More particularly it provides a method and structure for use by an operator to achieve automatic alignment and positioning of freight inside containers, trailers or other freight receptacles. There is also provided a freight placement index.

2. Background of the Invention

The method and devices of this invention automatically achieve proper freight placement inside trailers, containers or other freight receptacles. They are intended for use by an operator who may be inexperienced with positioning freight, state weight regulations, scales, computers or computer software, and are for use with trailers or containers or other freight receptacles, which are or are not specially adapted for a single type of freight.

Loads end up overweight because of the position of the load within the trailer or because the trailer as a whole is overweight. The overweight loads are detected by state departments of transportation or recently local authorities, and fines are levied by these authorities. The monetary fines are rising because they are being used in order to keep up with highway maintenance. In response fines are going up and increased surveillance is conducted.

The trucking industry has in the past used independent weigh scales to check on loads. The trailer is loaded with it's load and then taken to the independent weigh scale and either sent on it's route or returned to the loading dock where the load is redistributed in the trailer. At this point, they may again take the trailer to the scale to weigh-in. This procedure is repeated until the load is correct.

In compliance with state laws and regulations, the trucking operations are now weighing, measuring truck lengths, and counting axles. This process is both time consuming and expensive, and makes truckers frustrated and worried about time and money.

In addition to the fines encountered, unequal load distribution can cause midway swaying which creates handling and stability problems which are unsafe. Further excessive torsion forces may cause structural problems with the frame, unusual wear on the tires, and other parts of the freight cargo vehicles. This also increases maintenance costs.

The problems that are created with off loading of containers from the waterway shipping industry is another concern. Containers are commonly shipped not in accordance with our laws or rules and must be broken down and reloaded before rail, or trucks can be employed. Further, shippers often do not load in accordance with the difference in laws that the freight will encounter on it's journey. This means time and money to remove and reload in order to keep in compliance.

SUMMARY OF THE INVENTION

The present invention provides a solution to many of the problems discussed above. In particular, the present invention provides a practical, cost-effective, workable alternative to staging areas by docks or remote staging loads, or other on site training. The present invention captures the convenience of "one stop loading".

This invention is to provide an improved load monitoring system to assist an operator in correctly positioning cargo inside the vessel. Once inside the vessel, the operator has no accurate reference point which he may use. Using the visual, easily readable and conveniently placed Freight Placement Index (FPI) makes it easier to position and distribute loads not to be overweight and for equal weight distribution over the axles. The present invention eliminates the repetitive reloading to correct the load placements.

Knowing the pin position, mid point and axle ranges can make it easier for the operator to position loads. The FPI gives accurate positions making it easier for the operator inside the container who otherwise cannot see where these critical positions should be in relationship to the outside of the vehicle. The location of off-loading items in positions where they should be inside the container makes it easier to find them and to off-load them. If shifting has taken place the operator can visually line up where items were placed and determine if they have moved.

The object of the present invention is to provide an improved method for properly positioning freight in a container or other receptacle by using a weight scale/scanner which is connected to a computer, with appropriate software and the FPI for calculating the exact order and position of freight. The gross maximal payload distributed from axle to axle is computed and the Freight Placement Index shows the operator visually exactly where these item should be placed. This provides improved positioning for height, weight, length and width of freight. Further, this method provides a distributed load with a convenient visual reference.

Loads can be labeled or UPC coded and monitored for off loading or checked by having visual reference points inside the container.

In accordance with this invention an application known as a Freight Placement Index (known from here on as FPI) is provided which has numbered, colored, or otherwise marked areas along the surface of the index.

Part of the novelty and improvement of this invention lies in the use of the specially marked index, the FPI, used in conjunction (or independently) with a weigh scale/scanner and a computer program which processes information given by a load planner, forklift operator or driver to achieve accurate positioning of the freight without requiring great skill on the part of the load planner, forklift operator, driver or any extra equipment for the shipper (when the application is used alone).

The Freight Placement Index provides the operator with a visual display of exactly where freight should be positioned inside the container and where the load is to be placed to be distributed over the axles. The computer system utilizes and displays the current weight restriction laws while maximizing the load potential, for more equal loading, better stability and handling, and more convenient off-loading and less downtime. Cargo units that vary substantially can be easily and quickly computed to obtain uniform load distribution while taking off-loading into consideration.

The present invention serves the marketplace by reducing costs of employee time, equipment time, and fines or penalties. The computer, the scale, the scanner and the application FPI, may be used together in any combination or independently. No large physical modification of a standard trailer, container or freight receptacle is necessary other than the addition of the FPI and additional applications for reading.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 7 illustrates a freight placement index with example loads designated to be positioned according to the index;

FIG. 14 illustrates a Table of Permissible Gross Loads for vehicles according to Federal regulations;

FIG. 15, illustrates a Table of Permitted Vehicle Limitations according to South Carolina state regulations;

DETAILED DESCRIPTION OF THE PREFERRED EMBODIMENTS

The Elements of the Device

Figure 1:
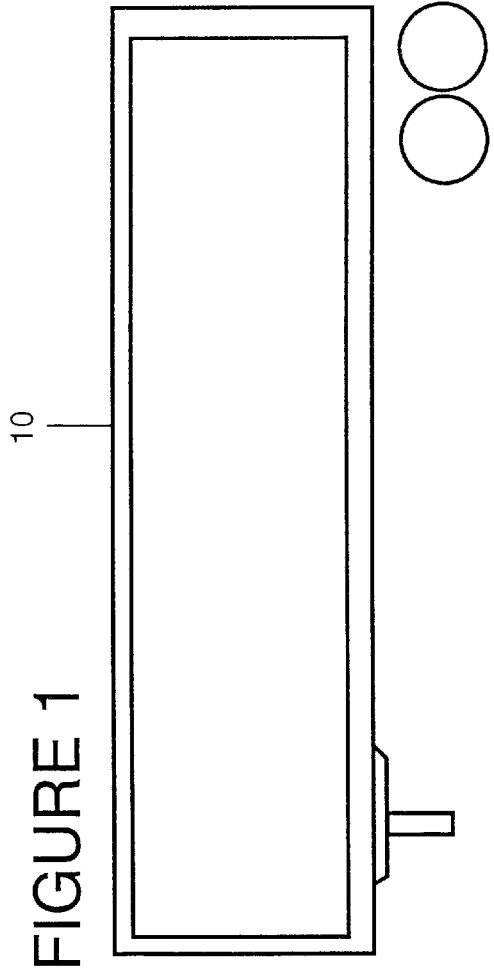
FIG. 1 illustrates a container, in particular a semi-trailer.

The Receptacle: Trailer, Containers, Vessels, Tankards, Flatbeds (FIG. 1).

The containers, vessels and trailers can be of the many types that currently are on the road or are being put on the road in accordance with laws and regulations on their size, length, and construction.

Figure 2:
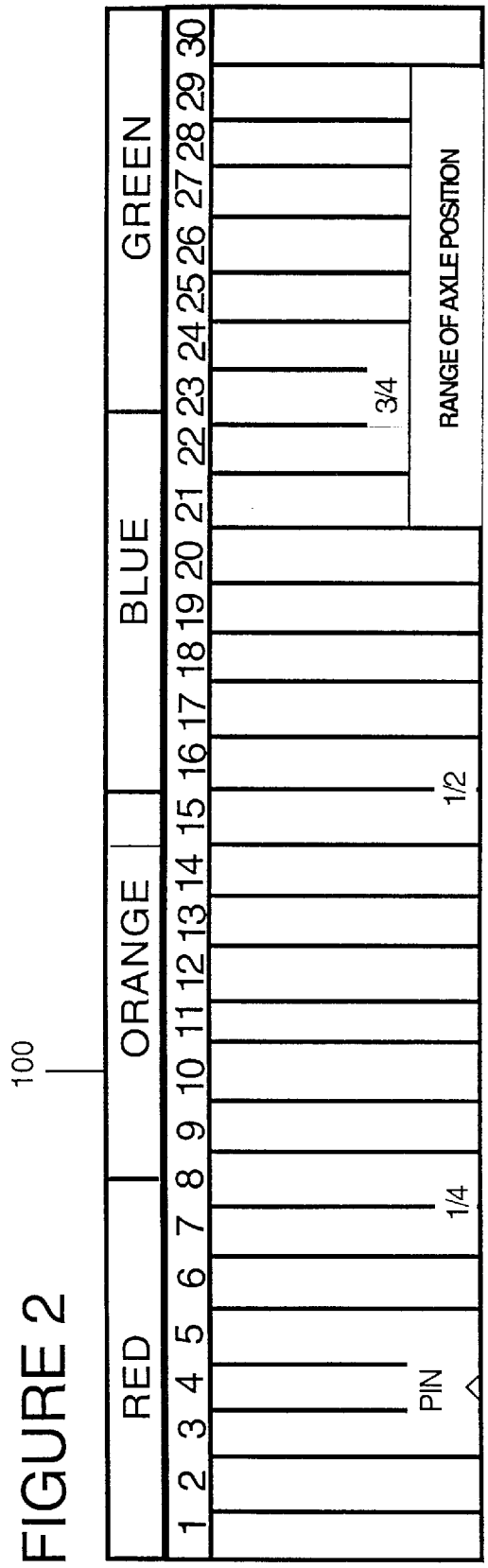
FIG. 2 illustrates the Freight Placement Index having indicia, numbers, colors, markings and other representative positions of freight placement elements.

The Freight Placement Index (F.P.I. FIG. 2)

The Freight Placement Index is a grid system for consistently locating portions of the container. The Freight Placement Index or FPI, may be made of a variety of materials including but not restricted to paper, fabrics, wood, metal, plastic laminates, combination materials, and may be applied via adhesives, fasteners, hangers, springs, nails, painting or printing, adhesive indicia, or etching devices. The application can also be correlated with letters or numbers, or a variety of other identifiers alone or used with others. This application includes indicia, letters, colors or other markings to identify the following points of importance depending on the type of container, but is not limited to:

(a) length of container;
(b) height of container;
(c) width of container;
(d) total cubic feet of container;
(e) pin position of the trailer;
(f) axle position of the trailer;
(g) range of position of the axles;
(h) mid point of the container;
(i) ¼ point of the container;
(j) ½ point of the container;
(k) ¾ point of the container;
(l) areas which may contain weight limitations;
(m) incremental positioning indicia;
(n) midpoint between axles and pin; and
(o) zones or areas used to indicate identifiable positions.

Figure 5A:
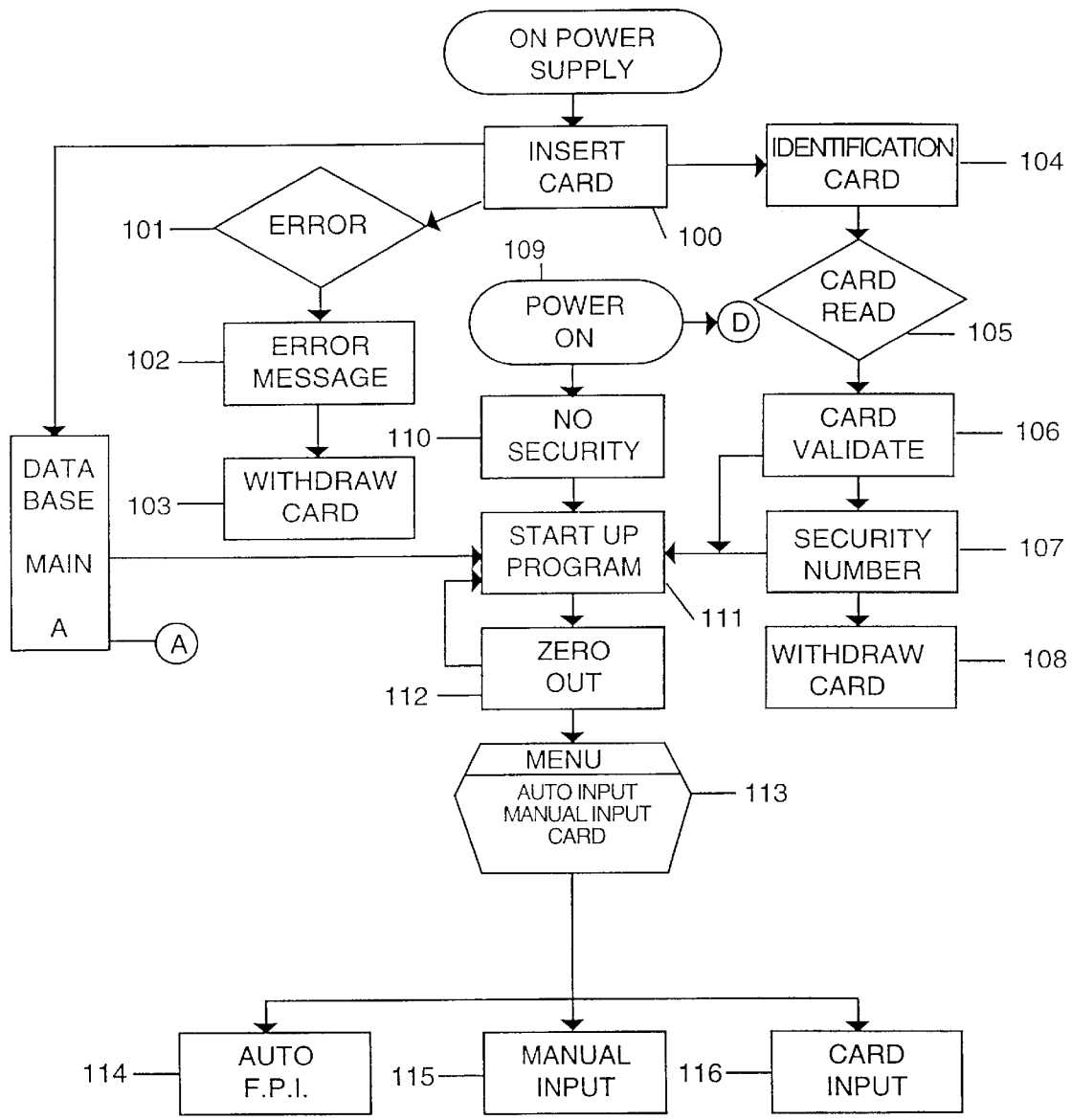
FIGS. 5A through 5J illustrate the flow chart of the computer program of the present invention.
Figure 5B:
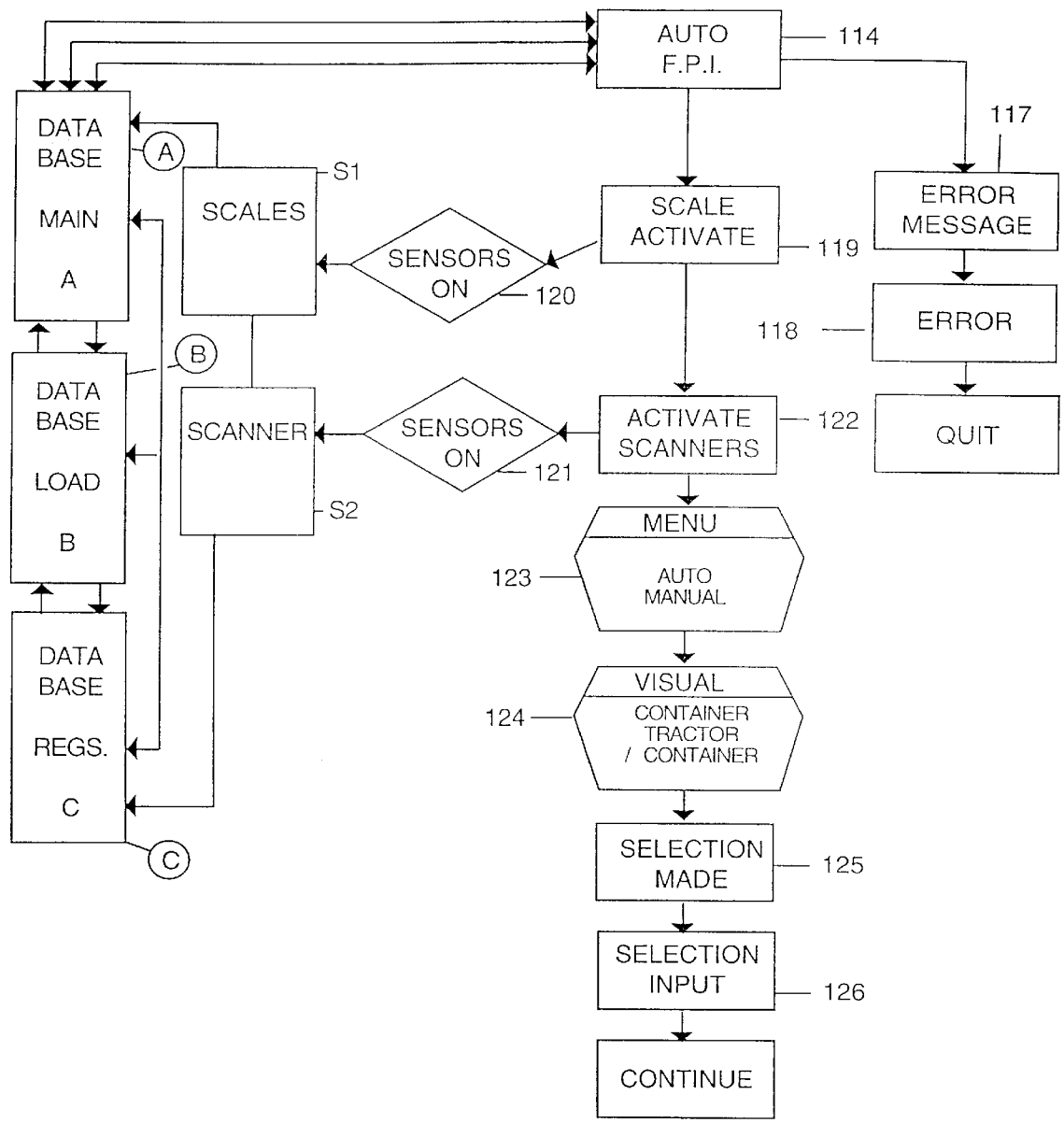
Figure 5C:
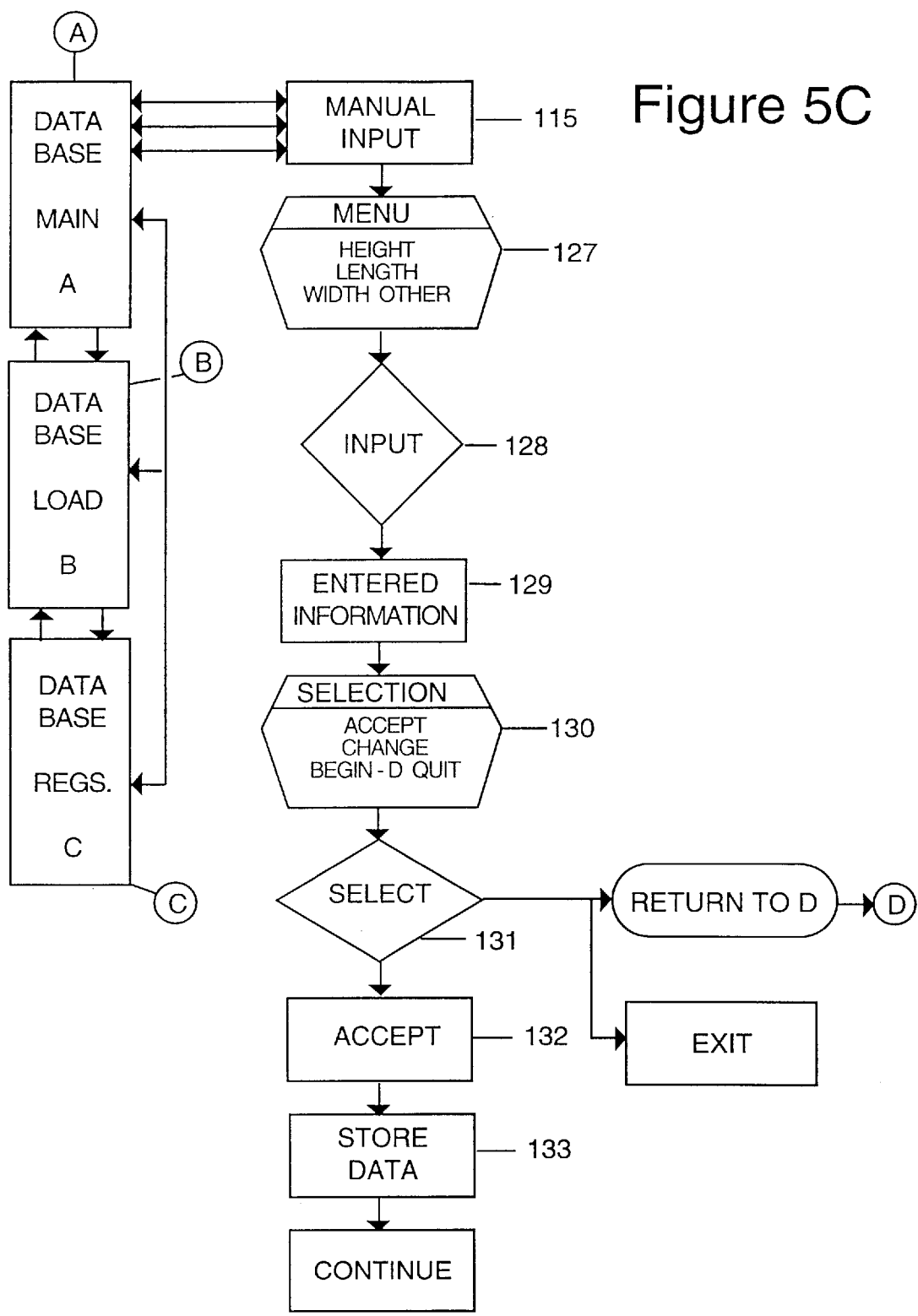
Figure 5D:
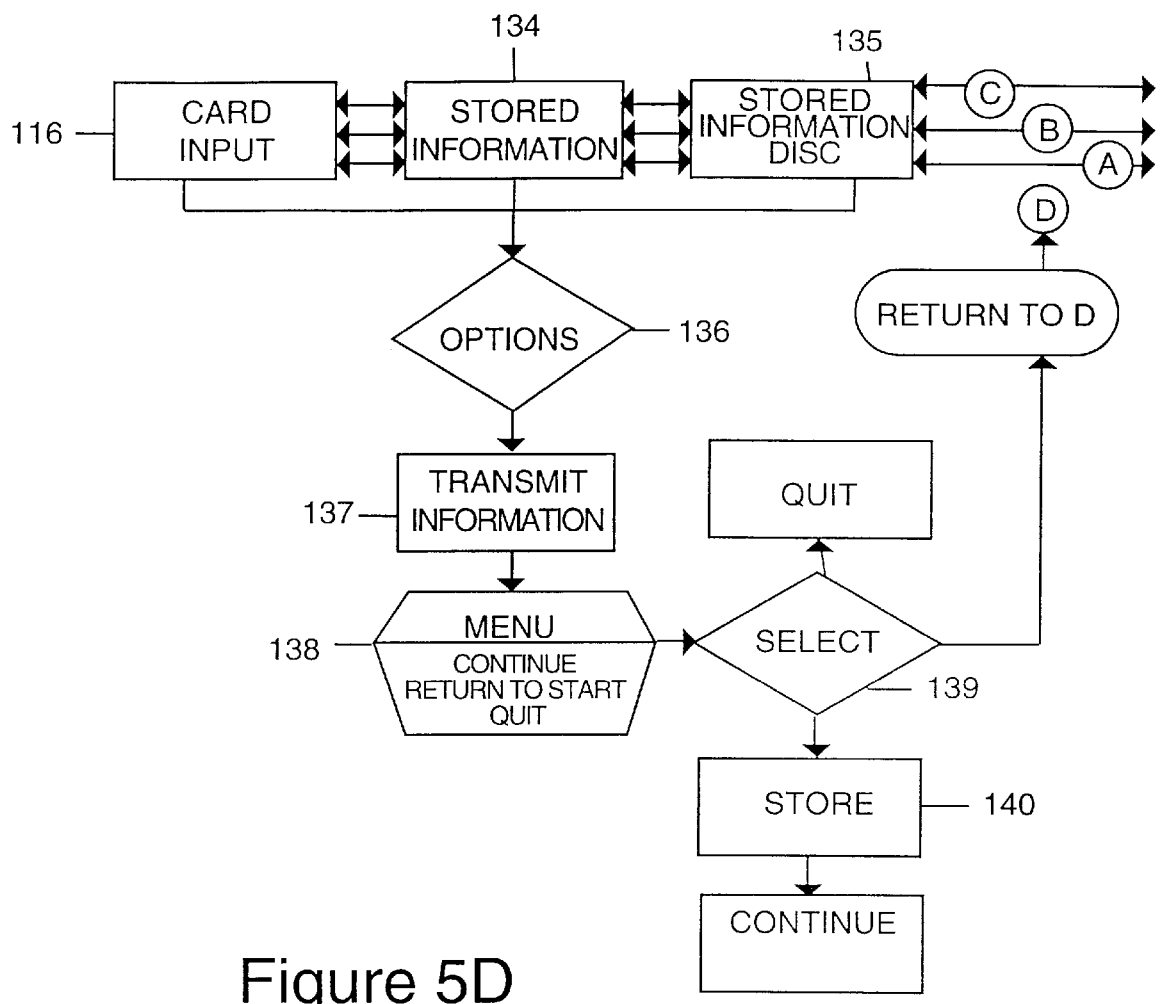
Figure 5E:
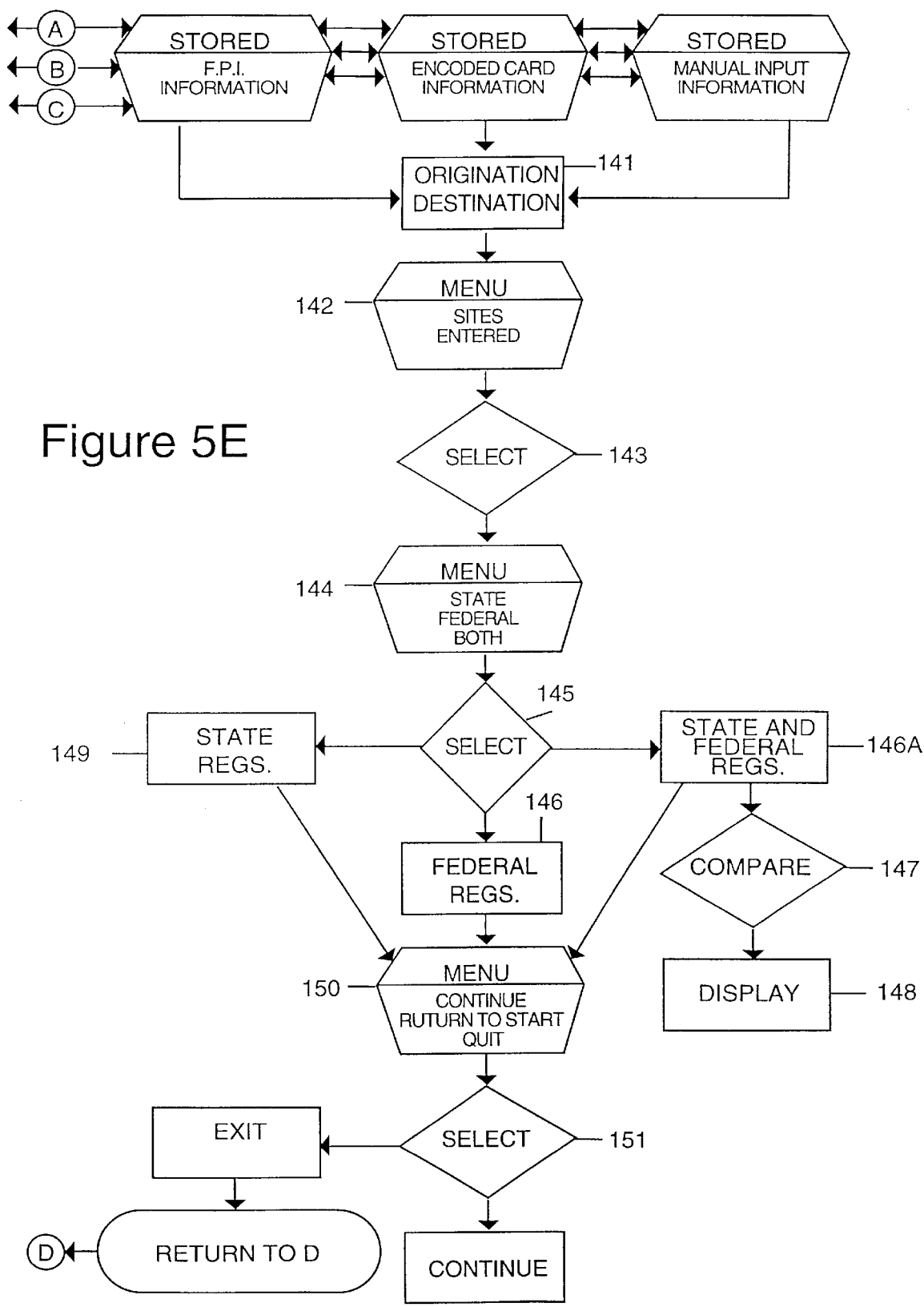
Figures 1, 5E:
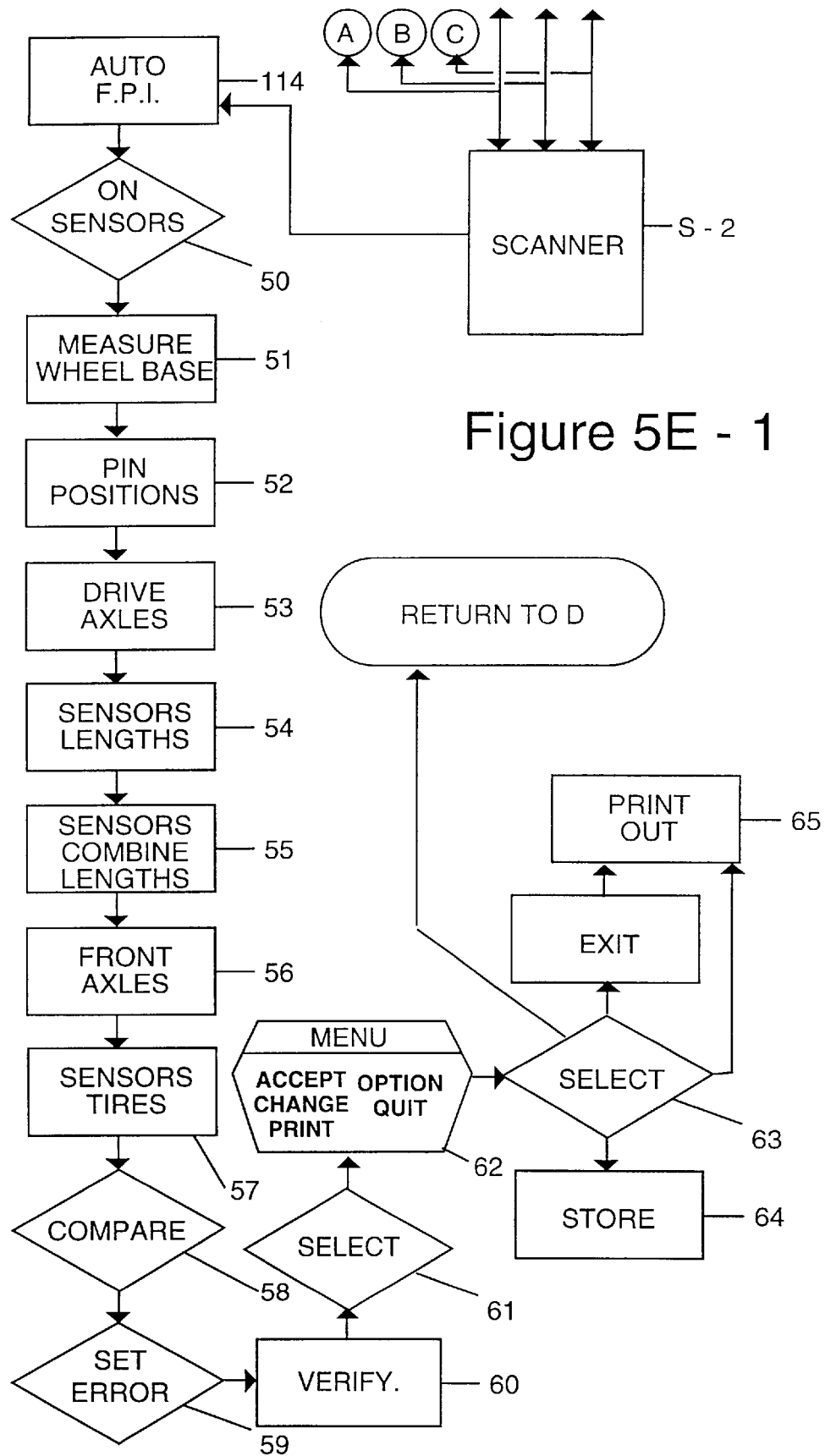
Figures 2, 5E:
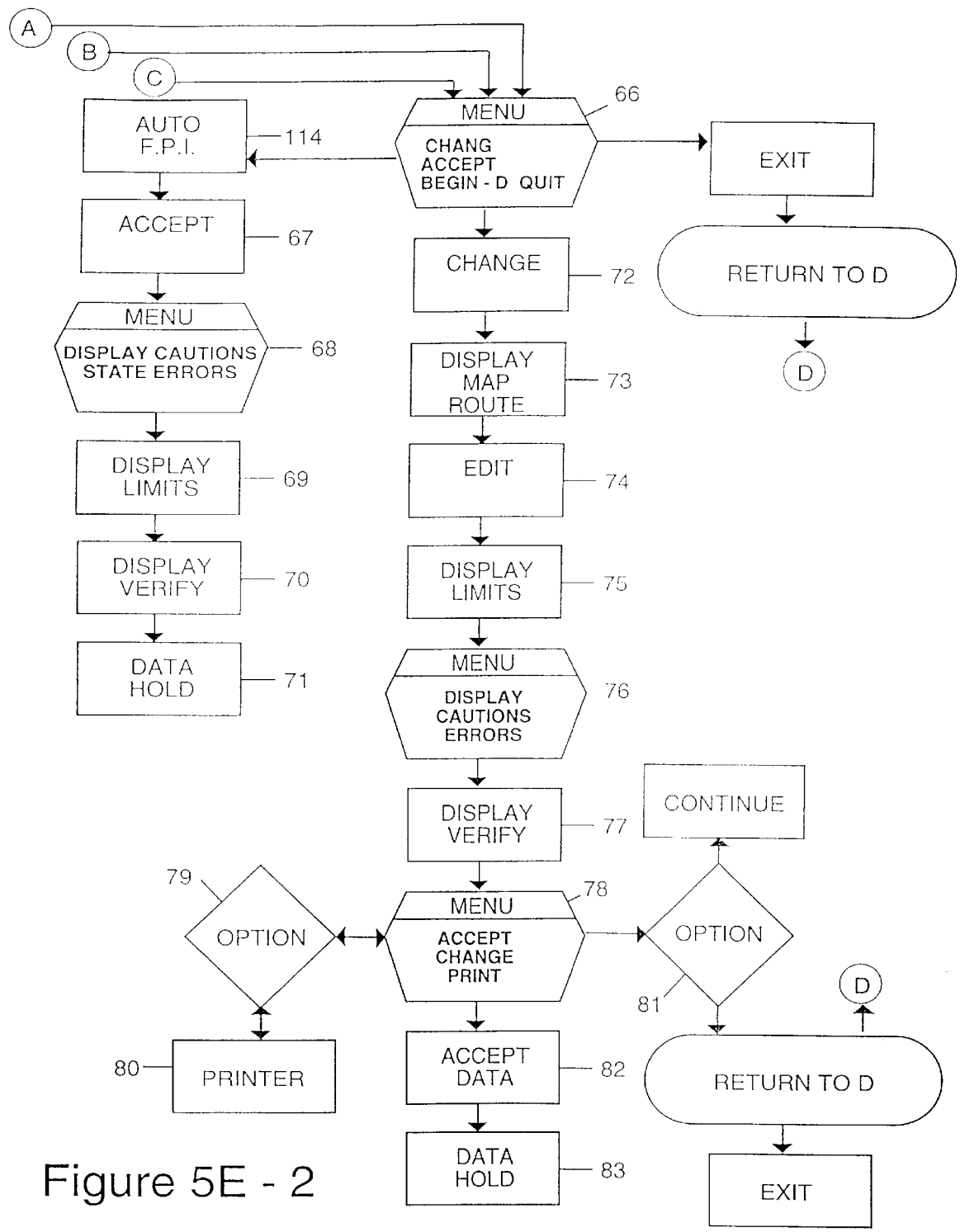
Figures 3, 5E:
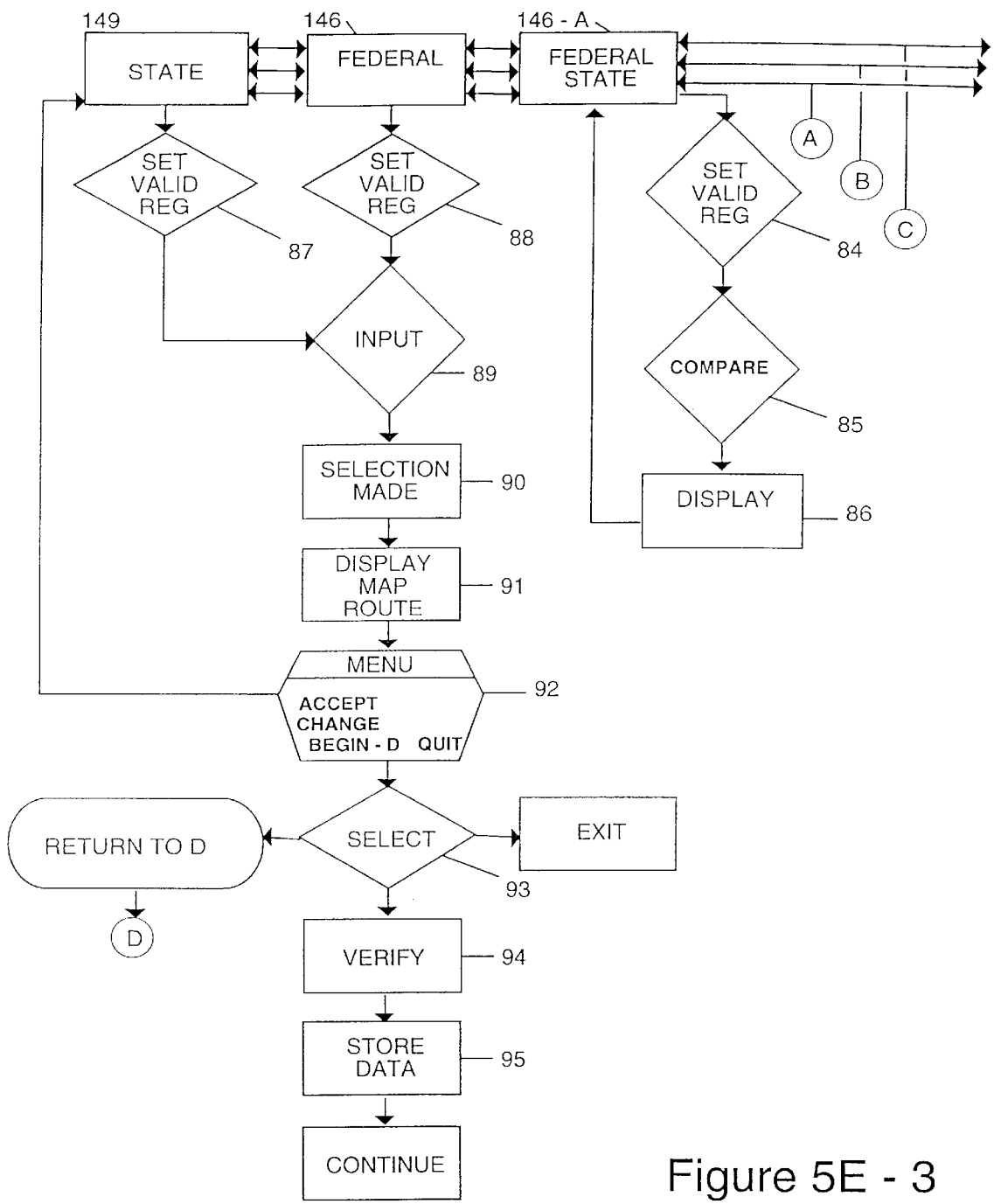
FIG. 3 illustrates a computer, a scanner system and a scale arranged according to the present invention.

The Scale (FIG. 3)

The scale is a weighing device which electronically transfers weight information to the computer system. The scale is intended to weigh material handling equipment, operators, and freight immediately prior to shipping as an integral part of the system. The scale is of a generic nature and is specific to the system only as to its ability to quantify weight.

The scale could also have special markings. The scale could have a digital readout, LCD readout, print readout, verbal readout, or any other type of read out. In the preferred embodiment the scale should be able to have the capacity to read/weigh the loads in a method of in-motion weighing.

The Computer and the Software (FIGS. 3. 5A–5J)

The computer terminal, key board, and monitor are of a generic nature, except for their ability to function as a means of inputting information from load planners, material handling operators and electronic scales. This includes ROM (read only memory) CD-ROM (compact disc read only memory) or any other type of storage systems for data storage. The computer system preferably provides control features: automatic test, low power indication, malfunction alerting, automatic power back up, auto-zero tracking digital or other weight averaging and manual calibration adjustment.

The system is preferably coated with sealant which protects, but allows the system to be repaired. The system can be hooked-up to print type devices, terminals or other types of retrieval devices.

The software however is unique and functions in a way in which it carries out the parameters that are described in this invention including the maximum allowable legal weights for various size trucks in accordance with the following formula of the Federal Highway Administration, DOT.

BRIDGE GROSS WEIGHT FORMULA: The standard specifying the relationship between axle (or groups of axles) spacing and the gross weight that (those) axle(s) may carry are expressed by the formula:

$$W = 500 \left( \frac{LN}{N-1} + 12N + 36 \right)$$

where W=overall gross weight on any group of two or more consecutive axles to the nearest 500 pounds, L=distance in feet between the extreme of any group of two or more consecutive axles, and N=number of axles in the group under consideration.

Federal Highway Administration, DOT 23 CFR ch.1 (4-1-92 Edition, part 658.5 page 260.)

Another example of data which is included in the database is:

Wisconsin Statutes 89–90 Chapter 348—page 3548—348.01—VEHICLES—SIZE, WEIGHT AND LOAD.

EXAMPLE: 348.05 SIZE AND LOAD—Width of vehicles.

(1) No person without a permit thereof shall operate on a highway any vehicle having a total width in excess of 8 feet 6 inches, except as otherwise provided in this section.

Included in the software maps of the routes the industry will employ, weight limits on roads or bridges, physics of the load placements, balance physics, physics for utilizing the maximum placements concerning large units or wide units or if height is a consideration limiting stacking.

Load data is recorded and saved and stored in the databases or discs and can be logged or in many ways printed out, carded or encrypted on other material to be used by the operator or applied to containers or trailers. Bills-of-Lading can be printed out from the computer generated information.

The keyboards and screens: The keyboards are generic in nature and could incorporate a slot for reading programmable cards and soft, i.e., programmable, selection keys adjacent to the screen. The function of these keys is described on the screen and relates to services being provided. These keys could be used for site specific problems. The keyboard is preferably constructed of pressure sensitive membranes and could be waterproof, and workable in extreme weather conditions, such as severe cold and heat.

The screens are generic in nature: colored or black and white. All equipment should be durable and weather resistant, if it is used in the elements. Desirably, the central computer or terminal is housed inside and data is relayed via cables or other relay equipment.

The preferred invention incorporates date and a real time clock and associate the clock feature to help the operators in calculation time for loading and keeping logs and relaying information to other terminal sites for the consideration of adding to the load at other drop-off sites or other freight terminals for back-loading (Return trips that are in need of a cargo).

Figure 4:
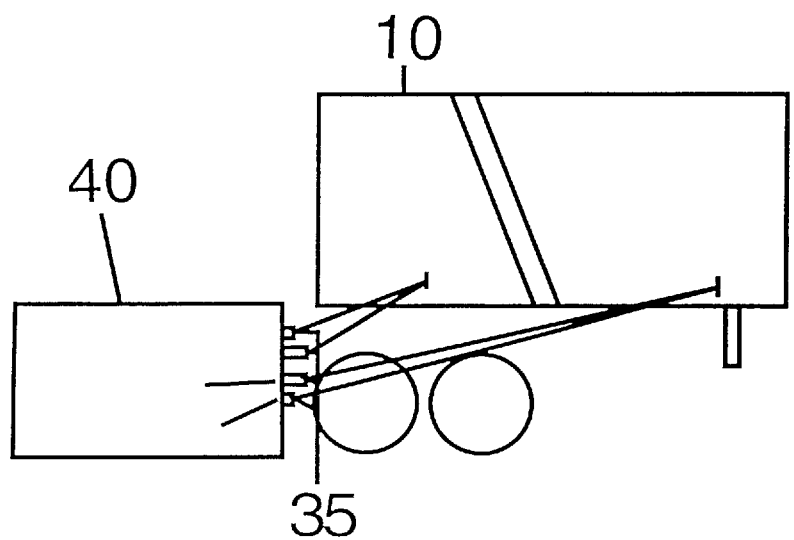
FIG. 4 illustrates a scanning unit which is able to scan relevant data from the tractor/trailer.

The Scanner (FIGS. 3 and 4)

The scanning units are well known in the marketplace. The scanner can be generic in nature, and have distance height and width measuring capabilities. The remaining part of the system observes the results of making a distance measurement. There are human readable or machine readable systems. There are multi-readable systems that currently read bar codes that are printed from various materials. Most units would be read by a laser, infrared wavelength, radio or other waves. One example is a system for electronically displaying information by signals that are broadcasted as electromagnetic energy selected from the spectral band consisting of infrared and light to modules from remote transmitters and the decoding of data from the signal. Microporous polymeric structures impregnated with ink that are suitable for laser scanning is another method for printing light scannable, coded images. Fraud prevention could be achieved with known printing methods or holograms or the like. There are portable scanning readers as well as stationary types. The scanning unit could be built into the weigh scales where the unit may read the height, length, and width of the units that are being weighed.

Information on where pin position is located, axle position, number of axles, wheel base length, and outside size of tires can also be scanned. The scanners would be mounted on the sides of the scale (FIGS. 3, 4) to determine the width and this would allow the scanning to be done as the load is weighed. The scanner could be placed mounted upwards on a support raised above the scale to scan downwards for height as the load is being weighed and scanned for width.

The trailer or container could also be scanned for the same issues, (FIGS. 3, 4) but preferably the scanner is built into the bumper guard rails or other available areas in the area of the trailer or container and will be lined up so that the scanner may take the reading from areas of the container or trailer. The scanner will read using laser, photoelectric cells, or other types of beams which reflect and bounce off the axles, tires, "foot print" of each wheel checking to see that it is not exceeding the valid maximum width, and can input information on the axle position and the location of the outside of the tires.

Other Applications

Other applications can be used that are not the FPI but are printable materials or cards that are produced for the use with other machines, i.e., the scanner or computer. To help with the identification, bar codes, color, numbers, letters, print type, reflectors, reflective materials or adhesives could be placed along side the axles for indicating the number of axles, and axle positions, pin position and even tire positions and would be scanned from there.

One way for reading and detecting is that the reflectors are positioned across from and laterally aligned with the photoelectric cells. When the axles of the tires are in position relative to the sensor, the beam or signal that comes from the photoelectric cell is blocked. The sensors optically or otherwise sense the length, number of axles and if necessary the outside of the tires. This creates a signal that is transmitted to the central processing unit, or computer with software, that will process this information along with all other information gathered and a computed output will be generated for the placement of the load taking into effect database information. Bar codes, identification cards, "smart cards" or other means for identification with specialized information could be placed on the trailers or containers and read by the scanner equipment.

Tractor trailers or containers, etc., with known information from the specifications from manufacturers and known tire size when installed and other information usable for the physics of the wheel load can be printed on the door or other placement on the vehicle. This information would preferably be encoded on a card or other identifier.

DETAILED DESCRIPTION OF PREFERRED SYSTEM

This description is a preferred system but is not limited to the preferred distribution system and can be changed or modified without departing from the scope of this invention.

The Freight Placement Index 100, as shown in FIG. 2, can be used alone or in conjunction with one or more of the systems that will be detailed in this invention.

FIG. 3 is a diagram of the preferred type of distribution system. The system contains a scale/scanner 20/30 and a computer system 50 including a monitor, keyboard, software, UPC bar-codes, and the Freight Placement Index (FPI).

The equipment when used together would be the scale 20 with or without a remote terminal, with or without a keyboard or monitor or display. The scanner 30 used alone or in conjunction with the scale 20, using laser, radio, microwave or other types of scanners. The computer 50 or hard drive with or without an input terminal, keyboard or keypads linked to specialized software and a computer monitor or video display screens. A telephone or hard line could be linked as a synchronous communications link connected to a telephone, radio, shortwave, microwave, public data networks or other digital packet networks between the remote terminal, keyboard, monitor or video and the central computer system. The data terminal can automatically transmit tone blocking signals to block signals, preventing interventions and interruptions to the service.

A central computer analyzes and processes data transactions. The central computer stores information about these freight loads in a database maintained for future reference, and generates freight placement positioning. The FPI application 100 is located inside or outside of the trailer 10 or container, mounted on walls, dock structures, floors or ceilings.

The method of this invention involves the load planner, forklift operator or driver weighing and scanning for length, height and width of the freight and entering the information into the computer. Then, using a computer software program which will then properly and automatically establish the correct position for the freight inside the trailer or container 10 by locating freight placement with the use of the FPI 100.

Additionally, the program may instruct the load planner, forklift operator, or driver to enter additional information about the weight of other freight, the destinations of that freight, the preferred sequence of reaching each destination, the size of the trailer or container and the position of the axles under the trailer, or numerous other factors. With this information, the computer 50 calculates the correct position of the freight with respect to weight, trailer size, axle position, destination of freight, the states the freight must pass through and the sequence of off-loading the freight.

The current invention also takes into account in the load planning, the positioning of the cargo for the initial loading and removal considerations, off-loading, and the correct positioning of the load in order to keep it balanced. The system also warns the operator of possible load shifting.

The Steps of the Operational System: (NUMBERS CORRELATE TO THE SOFTWARE FLOW CHART FIGS. 5A–5J)

Step Number 1: The operator turns on the system (FIG. 5A, 109) including the scale, monitor, scanner, computer, computer program and other peripherals. If security is a consideration a code (104) could be entered by the operator at the keyboard or on a remote input terminal, by the use of numbers, letters, magnetic card, encoded cards, personal identification numbers, passwords, or 3d-images, encryption systems or other security measures. This information is then entered.

Step Number 2: A screen with a welcome message introducing the start-up (111) program will begin if security is not a consideration or the security information has been entered.

Step Number 3: (FIG. 3) The scales are made structurally strong enough for the load hauling equipment and heavy loads going across them on a continual basis. (The scales can take readings as the loading equipment carries it across the scale with out having to stop and adjust for weight variances.)

A message to zero out the scale now appears on screen (112). The operator stands on the scale 20 area and the scale 20 weighs the person or persons or a forklift and a person, or what ever they are employing to move the load. The program then compensates and zeros out the weight of the machine and the operator. This could be set up as a standard default if it is a known amount that doesn't change or doesn't change enough to make a difference in the load totals.

Step Number 4: A scanner unit 35 (FIG. 3) is used to measure the trailer or container. Information on where the pin position is located, axle position, number of axles, wheel base length and size of tires are read into the computer (FIG. 5B, 122). The weight of the container can be predetermined and labeled on the trailer or container using bar codes or magnetic readable, wavelength tape or other identifiable and readable information systems (123, 124).

Figure 6:
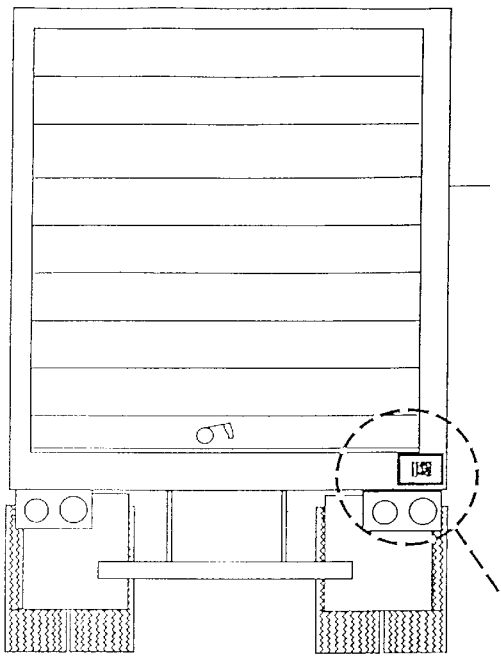
FIG. 6 illustrates a bar code system which contains the height, width, length and weight of the trailer.
Figure 6A:
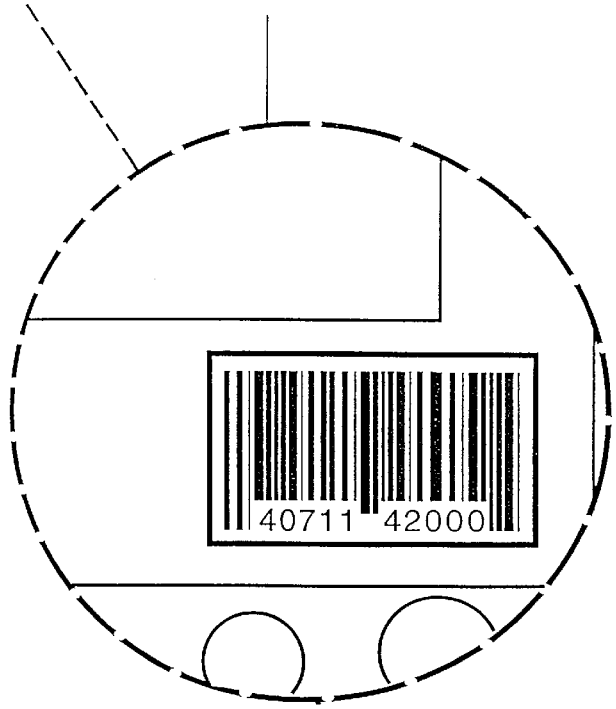

Additional information could be added on cards or applications and scanned if the operator felt these items were not readily changeable. Heights and lengths that do not change could be located in the readable coded information systems. Information encoded therein is relayed to the computer database A and used to determine load placement and load weight limits according to state and federal regulations in database B. Pin positions, axle positions, trailer weight and dimensions must be read, manually inputted or inputted by a card into the computer for each container or trailer that is loaded (FIG. 5A, 114, 115, 116). A readable bar code or magnetic, wavelength tape or other readable material indicating this information may be installed (FIG. 6).

After loading there can be readable information applied to the trailer 10 to indicate container or trailer specifications, (weight, length, etc.) origination and routes and load weights. This would be available at the finish of loading a trailer or container and all information used by the computer 50 or operator could be encoded and printed to be applied to the trailer 10 or container. This data information is entered and stored in the computer 50. This would make the loads traceable and information could be gathered in a shorter period of time with limited equipment. Especially traceable for terminal managers to help provide freight for back-loading (after the trailer reaches a destination it is efficient to pick-up freight to return home rather than returning empty).

Under the manual input method (FIG. 5A, 115), options appear that are deposited in database A, and the operator selects a trailer type or a container with specific information (127) on types of trailers and containers that are available. If the trailer type is not available or has been altered, the operator can manually enter the correct specifications with which he or she is working with. The operator can highlight the correct size, type and otherwise specify the correct information that identifies the trailer 10 or container with a mouse or other tool (FIG. 5C, 127).

The weight of the tractor or other hauling devices must also be taken into account because the load being placed on the front axles is inputted for the total gross weight for the regulations. Considerations are: gross weight of just the tractor, distance between the front axles and drive axles, tractor pin position and drive axles, weight distribution of the tractor over the drive axles and front axles, and any other information necessary to comply with regulations. Because these are known items, i.e., factory specifications, or items identified on sides of vehicles to comply with regulations, this could be encoded and used on a card that would be read as in step number 1 or read by scanning devices as in FIGS. 3, 4 and 6. This could also be entered by the operator manually on the keyboard at this time.

Step Number 5: The next message (141, FIG. 5E) asks the operator to then enter the origination and the destination of the load. The next screen will ask for individual drop-off sites (142, FIG. 5E) and States in order of the route for drop off designed by the operator.

At this point the operator must decide whether the federal regulations are to be the guidance for the load or if both federal and state regulations are to be considered (144, FIG. 5E).

If regulations do not change for the operator this step can be pre-programmed to engage and this step would be eliminated. The screen then has the option to show the different parameters of Federal or selected state weight restrictions and regulations (149, 146, 146-A). By pressing a "display difference" button or key, the operator can compare the different restrictions (147, 148). The operator has an option to input selected States from a list by highlighting or selecting by mouse or keyboard.

If, for example, Federal regulations are all that are to be used, a message (150) will give the operator the option to continue, or quit entry or begin again at step 2. The Federal regulations are considered from database B. The screen will show any problems it notes (75 FIG. 5E-2), i.e., roads closed, (updated information to be entered in the main computer database on an ongoing basis by the operator or manager of the system) construction, regulations or other information the driver or operator should consider.

Added data from the database C with the physics of load placements is enacted. The software program can be written with federal regulations as a standard default in database B. The forces of the load placement are computed, using a static analysis, within these specific parameters as a standard default.

The database C also contains the information of the FPI and relates all information about the load that is being considered (i.e., size, shape or unusual weight for load placement). To stream line the operations with some operators that have entries which do not change, i.e., same areas to ship to and same regulations adhered to, the software program could be pre-programmed and the operator could begin at Step Number 8. Once the federal regulations have been selected (FIG. 5E-3, 90) the screen will show Step Number 7, the operator then makes decisions on routes and other considerations.

Step Number 6: If state regulations (FIG. 5E, 149) must be taken into consideration, the information will be engaged through the software database B. Using the route the trailer or container will pass through, the computer can be asked to load the shipment with the most stringent state rules, or the operator can manually enter specific state rules (FIG. 5E-3, 87, 89). Information is relayed to the computer 50 with states, cities, towns and highway routes and weight restrictions according to state regulations and federal regulations all noted in database B (90).

Step Number 7: A screen with a map and route is shown (91). The operator can choose to accept, change or choose the option to quit or begin again at Step 2 (92). With the change button the operator can change routes with a mouse or other means to move lines on the screen. A new route will be mapped on the screen. The operator can accept the route when approved (93). The computer 50 will review the new information and show any problems it notes, i.e., road closed, construction, or regulations or other information the driver or operator should consider (94). Then the information will be stored in the databases.

Figure 5F:
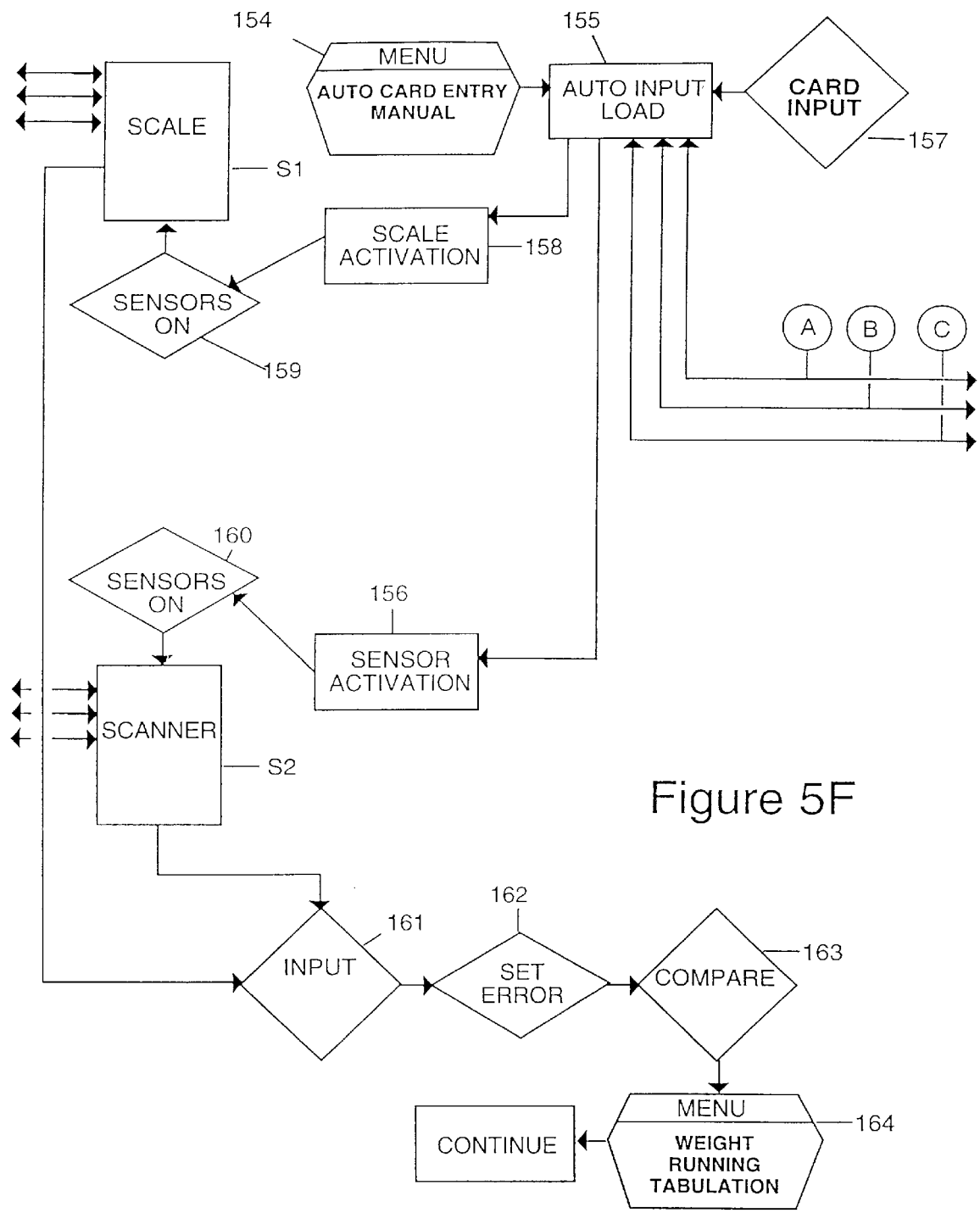
Figure 5G:
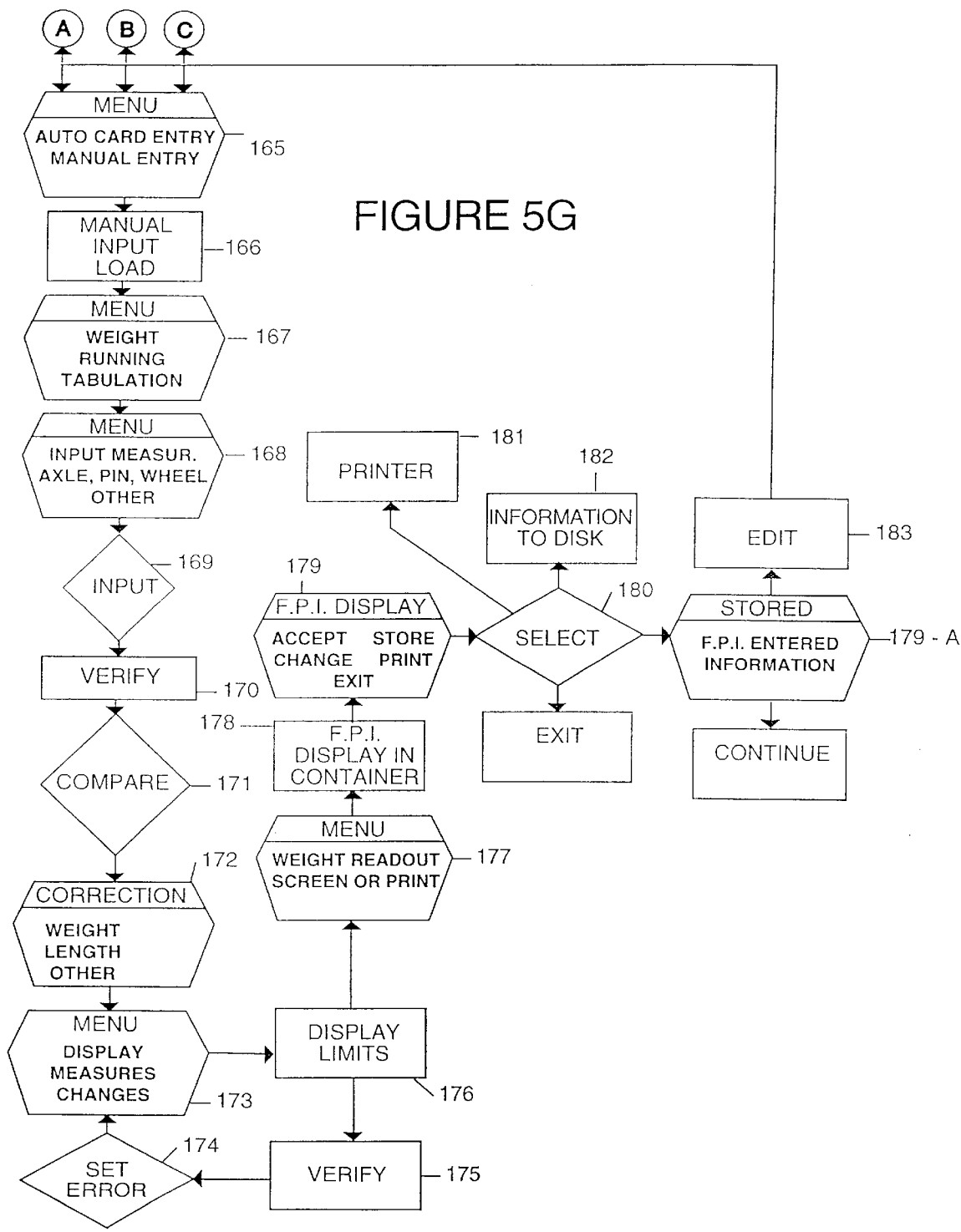

Step Number 8: The operator then picks up or collects individual pallets or other units, for the load that will be placed in the trailer 10 or container. The operator then proceeds by driving over the scale/scanner 20/30, and depositing the load on the dock 40 until the computer 50 compiles enough information for correct placement of the load (FIG. 5F, 155). The load could be read for the height, length and width by the scanner 30 (156, 160, S2). The load would be weighed by the scale 20 (158, 159, S1). The load can be broken down in units to be loaded and will be numbered, lettered, bar coded, or in other ways marked or identified for later handling by the operator. This is printed in Step 189, FIG. 5H later in the program. This can be done either before proceeding over the scale or after and coordinated by the computer.

The scanner (S2) can read the height, width and length of the loads by the use of lasers, radio waves or other read out methods. The data is inputted (161) and the computer 50 keeps a running account in the computer memory (FIG. 5F, 164). The pallet or load is weighed by the scale (S1).

Figure 5H:
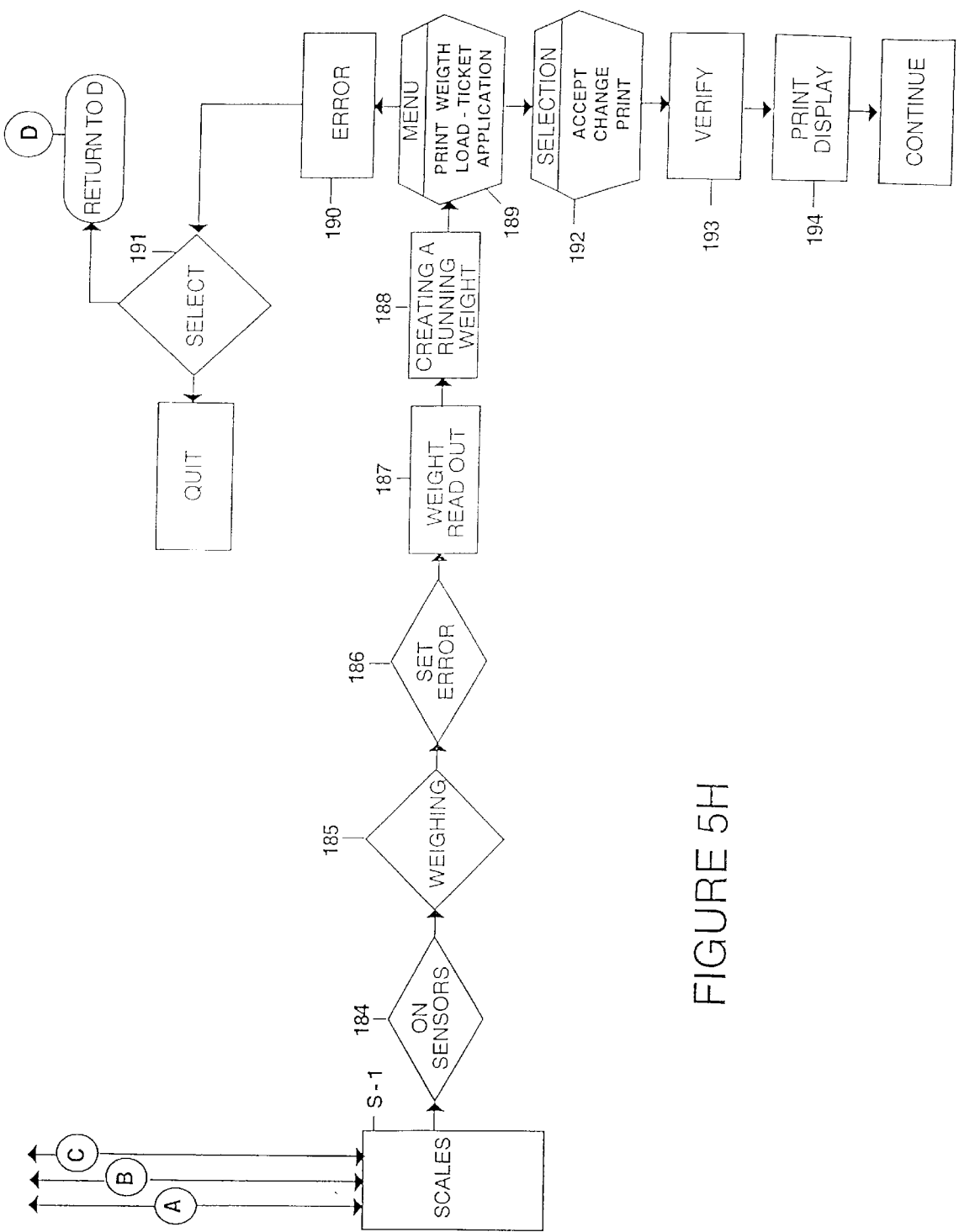
Figure 5I:
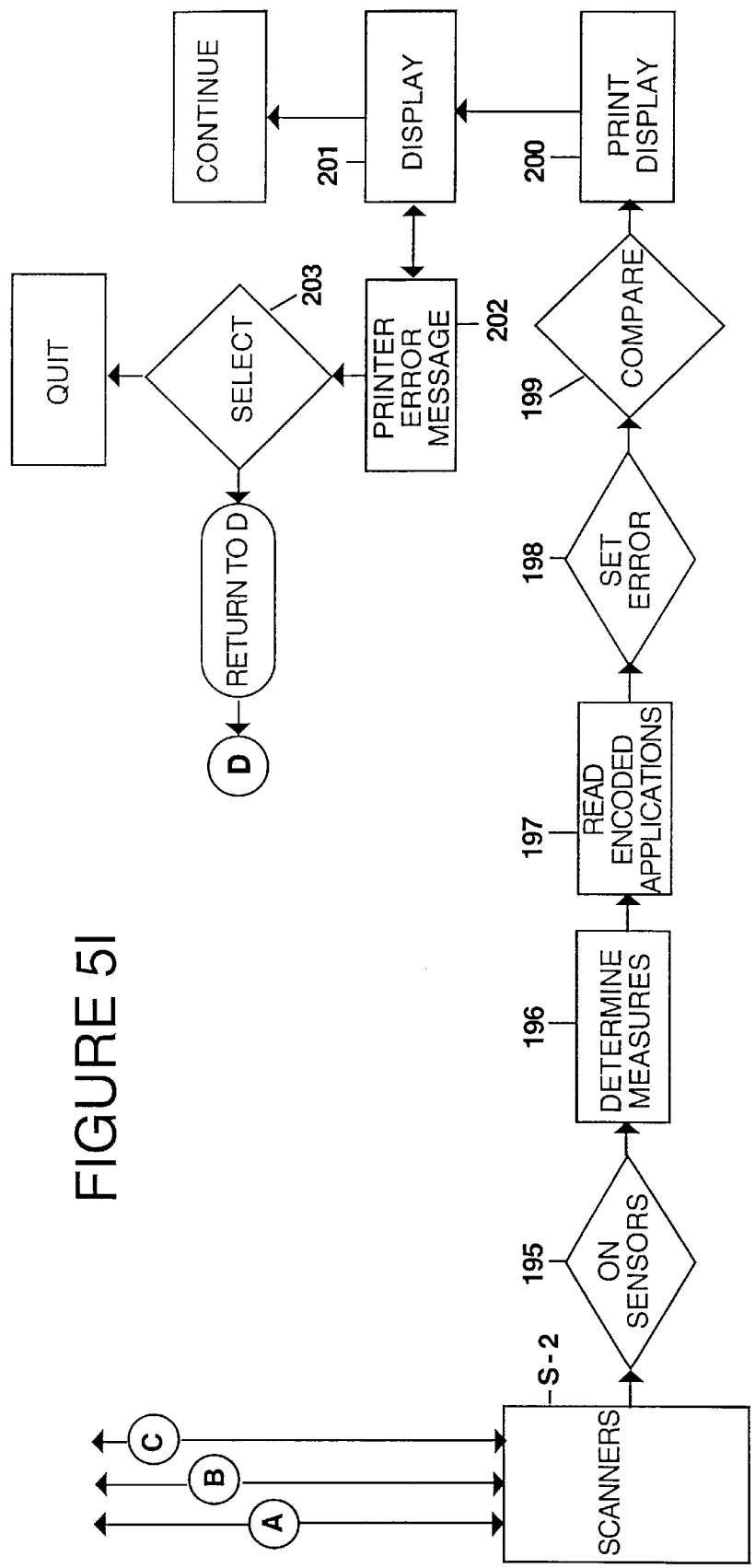
Figure 5J:
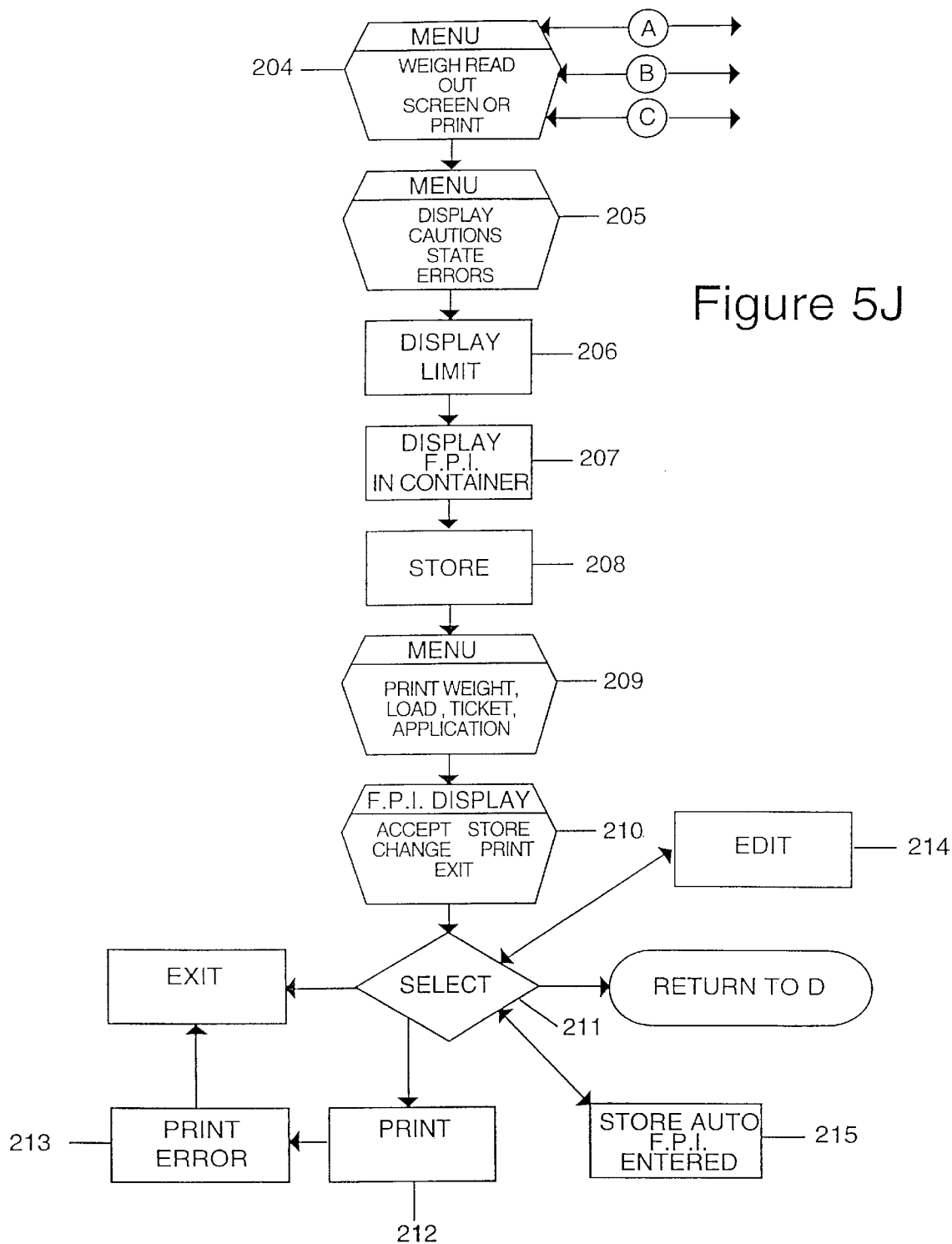

FIG. 5H is an indepth account of the functioning of the scales (S1).

Scanned by the scanner for height, length and width, the unit or pallet can be given a number or letter or other identification mark by the computer (stored in the computer database A). The load also at times need not be broken down according to length or weight. Some loads will fill the trailer or container by being bulky or by having very long length, before they maximize the total weight load. Some will maximize the weight limits before the trailer or container is filled. Some loads will be of different weights, heights, length and width and the invention will monitor these limits and limited placement opportunities. The computer keeps a running tab of different limits that are computed as the operator takes loads over the scale.

The loads are set down on a staging area or dock and the loads are numbered or otherwise marked to be placed inside the trailer or container.

Step Number 8B: The above data can also be entered manually (FIG. 5G, 165) on the keyboard (166) and have the computer keep tack of height and width of each individual load (4) by entering known data with the numbered keys for height, length, width and weight, easily accessible by the operator at the keyboard, monitor or on the forklift monitor or keyboard by the fork lift operator. The operator can have the computer keep a running tab (167) or enter on a per-load basis where the operator would have to press enter after each load. Additional steps can be added for inputting trailer information (168), and for verifying and correcting the inputted data (169–175). This data is received by the data base C and is computed for placement with the FPI. The limit for loading is displayed on a screen or a printout (176). As the limit is neared, the computer database C will indicate the operator is nearing the load limits by a screen display, printout or audio communications (176).

Step Number 9: The Freight Placement Index 100 on the inside of the trailer or container will be used to guide the operator where exactly to place the load (178). The information from step number 8, has to be sent to the computer 50 for the databases to analyze and associate the cargo placement with the FPI 100.

The computer will first align the cargo sequentially in the trailer in an order most preferable for off-loading. The computer will then perform a static analysis to determine the weight applied to each axle. The determined weight on each axle is then compared to the road weight limit regulations. If the weight on the axles is under the limit then the computer approves the load as arranged and prints out the cargo distribution with respect to Freight Placement Index. If the weight on each axle is over the limit then the computer redistributes the cargo which was originally arranged sequentially due to off-loading, by selecting the heaviest load near an overloaded axle and moving it to a position over an underloaded axle. Another static load calculation would be performed and this process would be continued until an acceptable load distribution is obtained in order to meet weight limit regulations.

The operator has the option (179) to print or edit the load and it will begin again at step 2. The load is then displayed within the container or trailer using the FPI 100 as the reference point. The display (207) of the load on the monitor (212) or print out will coincide with the load placement markings inside the trailer or container 10. The display will tell the operator to position the loads that have been identified earlier in the program and are coordinated and numbered for identification. This arrangement can be approved by the operator (this could be streamlined and standard defaults can be setup to expedite the procedure).

The screen shows the operator where to place the loads for maximum utilization and in keeping with the indicated regulations (207). A readout of the placement in accordance to the FPI 100 appears on the monitor on the scale/scanner 20/30, screen or monitor on the forklift, or hardcopy printout (210, FIG. 5J). Information could also be voice activated and given and taken by the operator to the computer.

Step number 10: The printout or screen has indicated where the load should be placed using the FPI invention. The operator then picks up the load that was placed on the loading dock 40 or other staging area, and places the loads in accordance with the FPI 100. The FPI 100 inside the trailer 10 or container will be used to guide the operator where exactly to place the load.

FIG. 7 shows the FPI 100 in use with different loads arranged under it. The application is colored eight shades of red in the first weight zone (starting at the furthest from the loading door) darkest red to the lightest red zone. The next eight weight zones from a very dark orange to a very light orange. The next eight weight zones from very dark blue to light blue. The next eight weight zones from a very dark green to a light green. The application inside the trailers can be color coded or marked in any way to make it easy for the operator to know where the print out or monitor indicates the load should be placed, or it can be numbered or lettered or in other ways distinguished so that the operator has reference points inside the trailer that can be custom made for trailer sizes. The color code could be displayed as follows:

| RED | | ORANGE | | Mid | | BLUE | | GREEN |
|---|---|---|---|---|---|---|---|---|
| 1 | 4 | 8 | 12 | 16 | 20 | 24 | 28 | 32 |
| PIN | | | | | | RANGE OF AXLE | | |

Figure 16A:
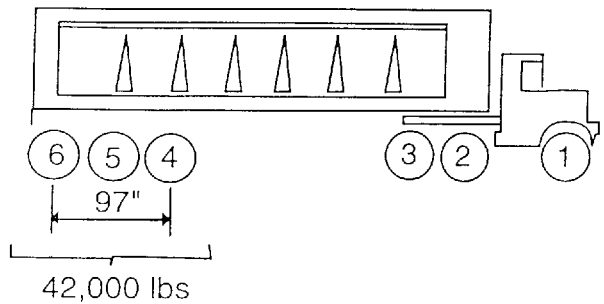
FIGS. 16A, 16B, 17A, 17B, 18A, 18B and 19 illustrate example truck loads for illustrative calculation purposes.

FIG. 16 illustrates a Federal weight limit regulation table while FIG. 17 illustrates a state weight limit regulation table. The bridge gross weight formula provides a standard to control the spacing of truck axles on vehicles that use highway bridges. The Formula as shown in FIG. 14 is:

$$W = 500 \left( \frac{LN}{N-1} \right) + 12N + 36$$

where W=the maximum weight in pounds that can be carried on a group of two or more axles to the nearest 500 pounds. L=spacing in feet between the outer axles of any two or more consecutive axles. N=number of axles being considered.

Gross weight is the weight of a vehicle and/or vehicle combination without load plus the weight of and load thereon. The federal gross weight limit on the Interstate is 80,000 pounds.

Single Axle Weight is the total weight transmitted by all wheels whose centers may be included between two parallel transverse vertical planes forty inches apart, extending across the full width of the vehicle. The federal single axle weight limit on the Interstate is 20,000 pounds.

Tandem Axle Weight is the total weight transmitted to the road by two or more consecutive axles whose centers may be included between parallel vertical planes spaced more than 40 inches and not more that 96 inches apart, extending across the full width of the vehicle. The federal tandem axle weight limit on the Interstate is 34,000 pounds. A distinction is made at the 8 foot distance. Due to the tandem axle weight definition causing a considerable difference in the axle load, depending on the spacing of the axles; being 8 feet, less than 8 feet or more than 8 feet. The axle weight limit for any spacing greater than 8 feet (96 inches) shall be in accordance with the bridge formula as stated above. The tandem axle weight definition is not applicable when the spacing exceeds 96 inches. For a vehicle with 3 axles spaced 97 inches apart (greater than 8 feet) the permissible load would be 42,000 pounds carried by the 3 axles.

Figure 16B:
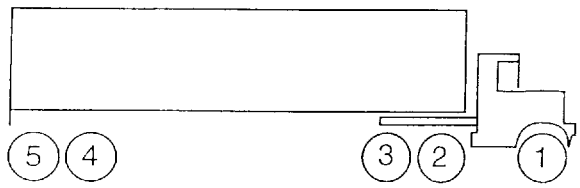
Figure 17A:
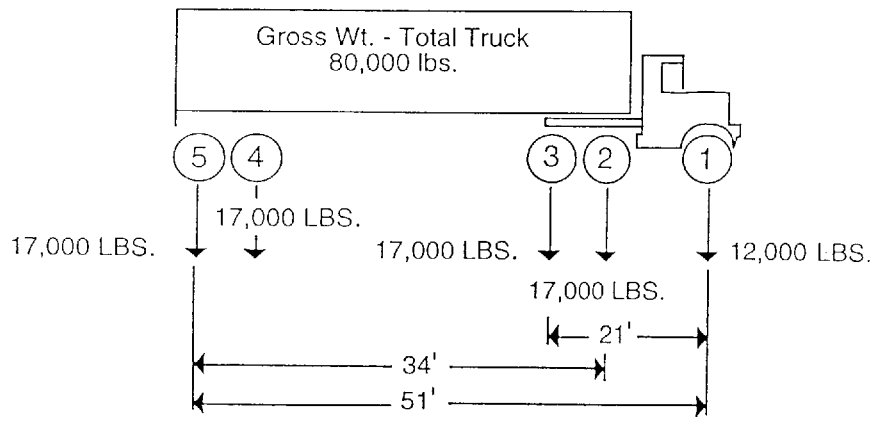
Figure 17B:
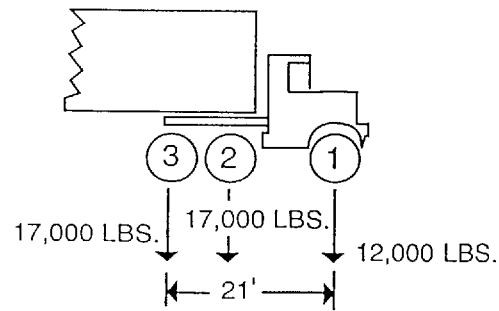

FIG. 16B illustrates a truck and trailer with the most common axle arrangement. Axle numbers 1–3,1–5,2–5 are the critical combinations to be checked for weight. (FIG. 17A) Before the operator checks axles 1–3, he/she should see that single, tandem and gross weights are not over the maximum. The single axle #1 does not exceed 20,000#, tandems 2–3 and 4–5 do not exceed 34,000# and the gross weight does not exceed 80,000#. (FIG. 17B) In order to show the Bridge formula in action a calculation for the 1—3 axles (FIG. 17B) is shown below.

W=(actual weight)=12,000+17,000+17,000=46,000
N=3 axles
L=21 feet $$W \text{ maximum} = 500 \left( \frac{LN}{N-1} + 12N + 36 \right) =$$

$$500 \left[ \frac{(21 \times 3)}{(3-1)} + 36 \right] = 51,500$$

This is the same number as obtained from FIG. 16

Figure 18A:
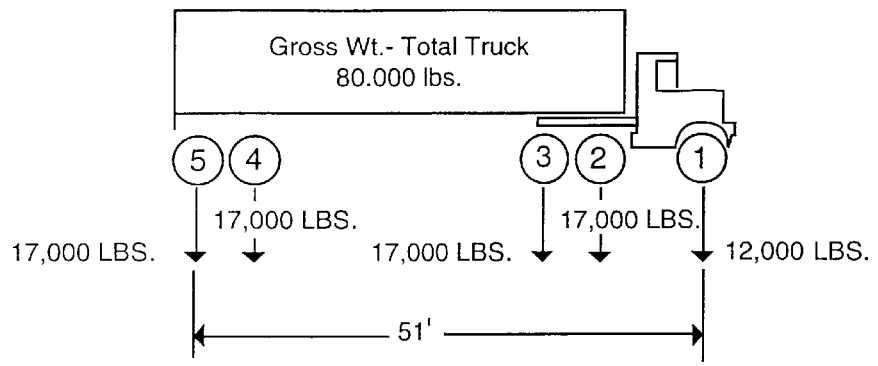

FIG. 18A illustrates the forces on each of the axles 1–5. From FIG. 18A, W (actual)=12,000+17,000+17,000+17,000+17,000 =80,000#.

From FIG. 14, W maximum at 1=51 ft. and N of 5 equals 80,000 lb. Therefore, the weight restriction is met.

Figure 18B:
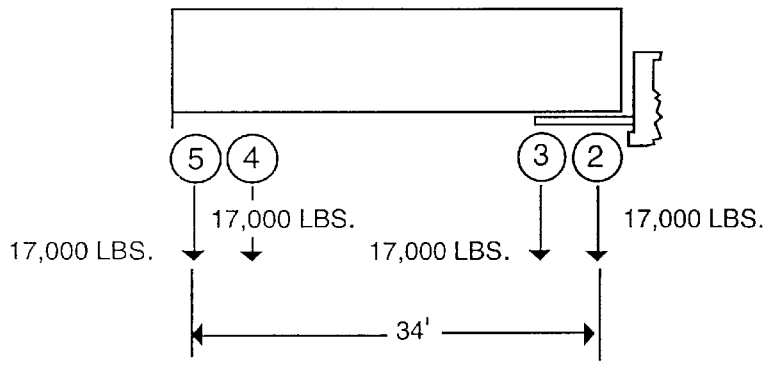

FIG. 18B illustrates the forces on each of the axles 2–5. From FIG. 18B, W(actual)=17,000+17,000+17,000+17,000=68,000 lb.

From FIG. 14, W maximum for L of 34 feet and N of 4 equals 64,500 lb.

As can be seen, the W(actual) exceeds the maximum allowed given the axle spacing. To correct this—some load must be removed or the axles spacing increased to conform to the load law. (There are some exceptions to the formula and these are stated in the Federal law).

Figure 19:
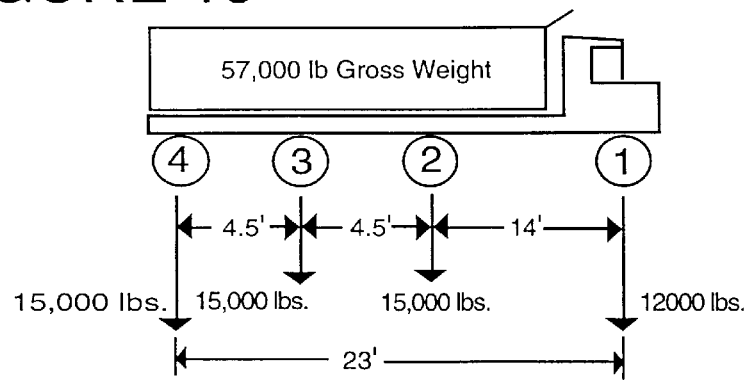

FIG. 19 illustrates the weight calculations for single unit trucks. The front axle has a weight of 12,000 lb. which is less than the limit of 20,000 lb. for single axles. The tandem axle weights of 30,000 lb. is less than the limit of 34,000 lb.

Finally, W(actual)=57,000 lb. is less than the gross limit of 80,000 lb.

The calculation for axles 1–4 is as follows:
W(actual)=12,000+15,000+15,000+15,000=57,000 lb., and
W maximum for N of 4 and L of 23 feet equals 57,500 lb. FIG. 14). Therefore, W(actual) is within the permitted limit.

The calculation for axles 2–4 is as follows:
W (actual)=15,000+15,000+15,000=45,000 lb., and
W maximum for N of 3 and L of 9 feet equals 42,500 lb. (FIG. 14). The actual weight for axles 2–4 exceeds the federal law and the load would have to be reduced or axles added or spacing changed.

FIG. 15 shows an example of State size/weight limits that are different from the Federal size/weight limits.

WEIGHT OF PALLETS OR UNITS

An example calculation of the load in a trailer in order to meet load restrictions is as follows: tandem axles may carry a gross load of 34,000 pounds each if the overall distance between the first and last axle is 36 ft or more in no case shall any vehicle exceed 80,000 pounds (front axle, drive axle, and trailer axle). In this example, the Tractor/Trailer length is 51 foot and the distance between the rear and drive axles is 34 ft. The tractor is 12,000 lb.

The Units or pallets listed from the heaviest to the lightest are 10 9 7 6 8 2 4 3 1 5
10—8,500 lb. 9—8,500 lb. 8—4,000 lb.
2—4,000 lb. 4—4,000 lb. 3—4,000 lb.
1—4,000 lb. 5—4,000 lb. 7—8,500 lb.
6—8,500 lb. Total load 58,000 lb.
tractor—12,000 lb. lb.=pounds
Total=70,000 lb.
Maximum=80,000 pounds The drive axles are loaded to 90% of the allowable weight 34,000 lb. gross weight.

The rear axles are loaded to 90% of the allowable weight 34,000 lb. gross weight.

The units that are loaded are 2.8 ft in length and 6 ft. tall per unit box. This load is uniform and is distributed in an even manner. It is bulky in nature and fills the container up in height so that no more weight can be added in a decking type fashion.

Figure 8:
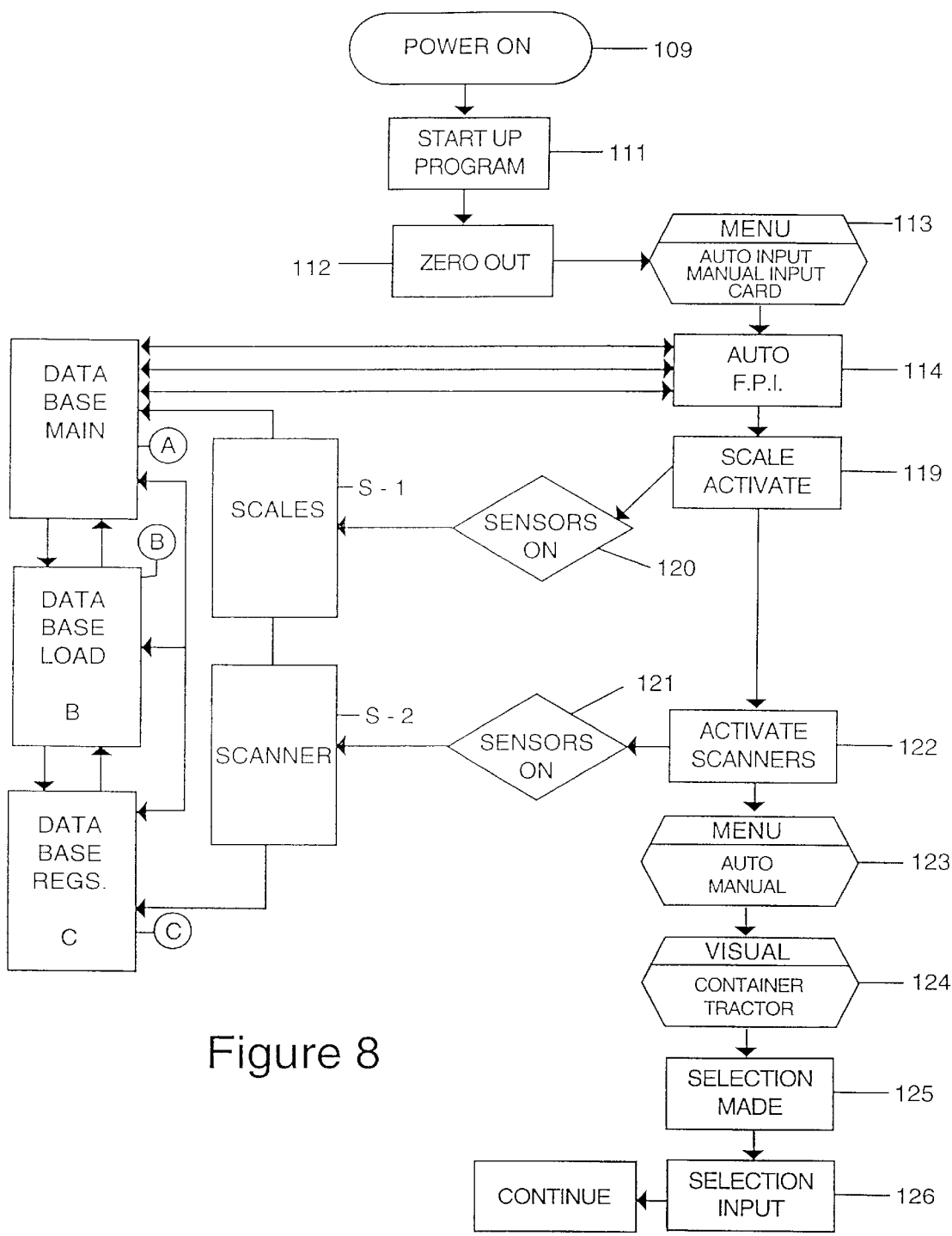
FIG. 8–13 illustrate the flow chart of the computer program according to an example cycle of the program of the present invention.

The weight, size and height of the trailer have already been determined by the program (114). The entire load has just one destination (one stop). Load example:

Example: The operator uses the system in the above explanation as follows:

Power on (FIG. 8, 109). A startup program with no security begins (111). The operator begins first with weighing the forklift with the operator thereon and has zeroed out the program which will not add the weight of the operator or forklift into the weight of the load (112). The Menu of Auto input is selected (113). The operator selects the Auto FPI to be used (114). The scale sensors 20 and the scanner sensors 30 are activated (119-122).

Figure 9:
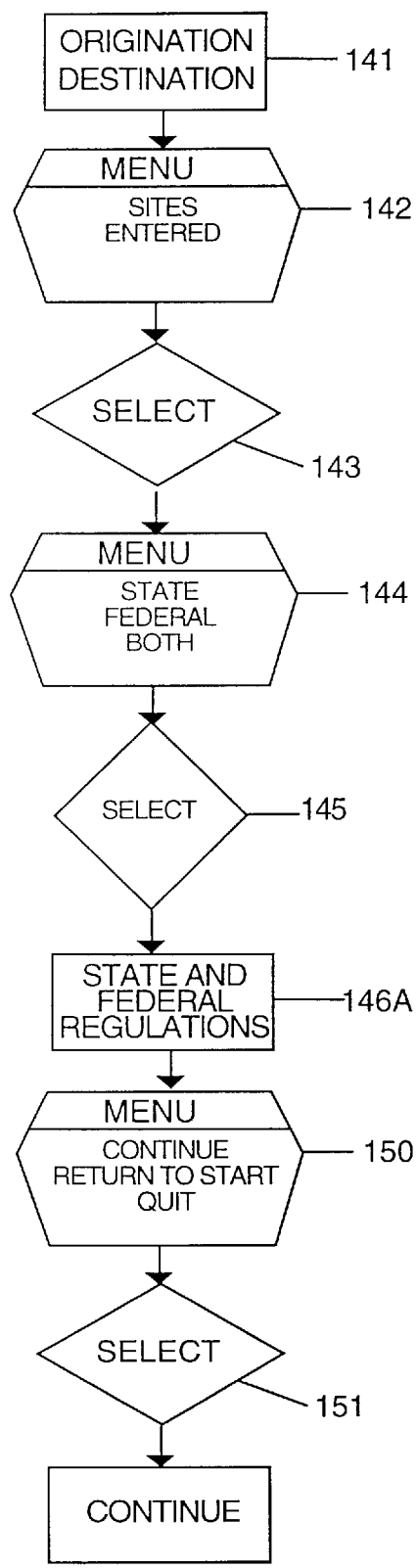

The operational system is used from step number 1 to Step Number 10 as described above. The operator picks up the loads that are on the staging area 40 (FIG. 3) and carries the load over the scale 20 and scanner 30. The operator then selects "auto" (123), and proceeds through the tractor/trailer/container input selections (124–126). The operator will enter the origination and destination of the cargo (FIG. 9, 141), and the drop off sites (142) will be selected (143).

Figure 10:
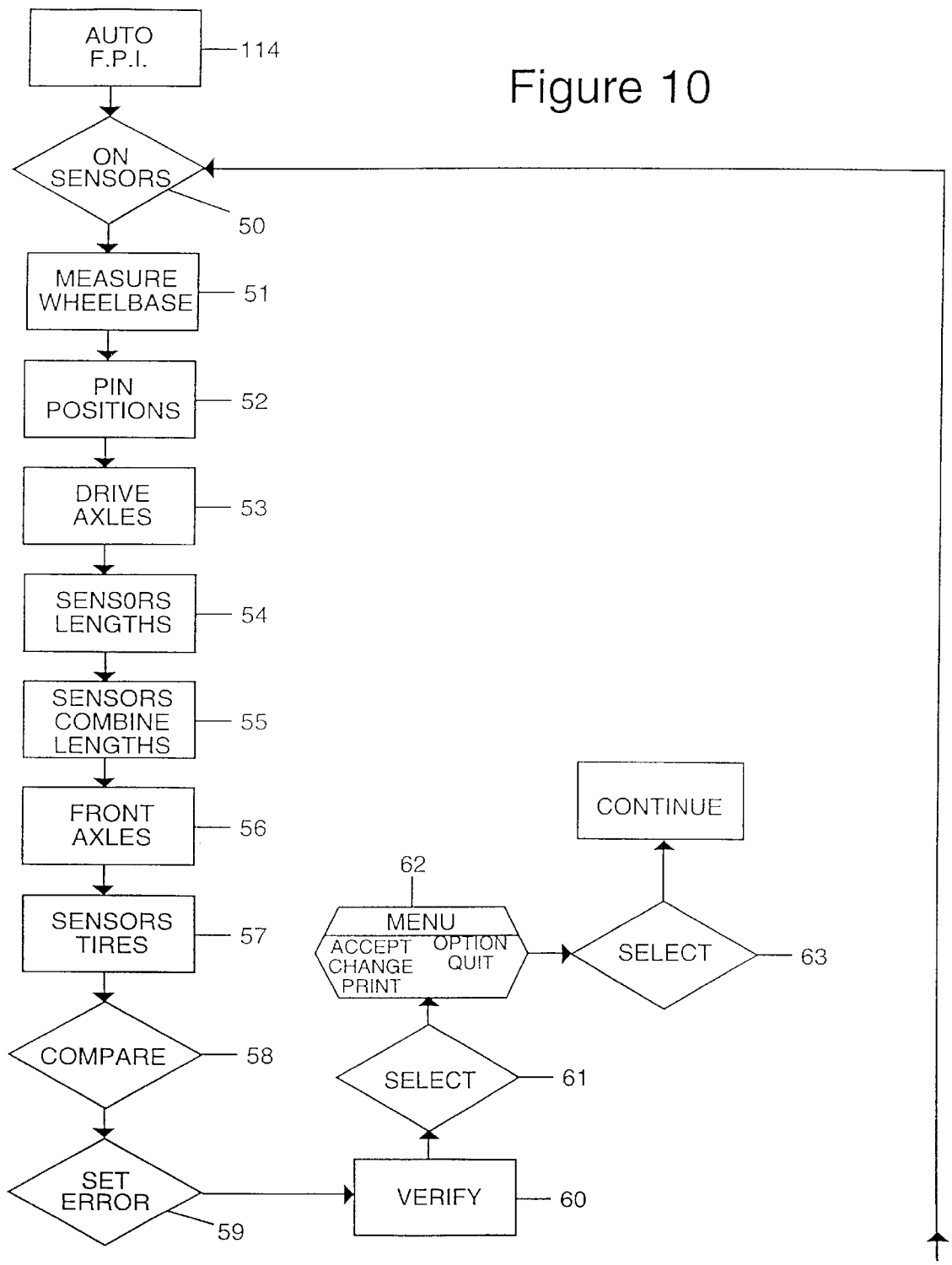
Figure 11:
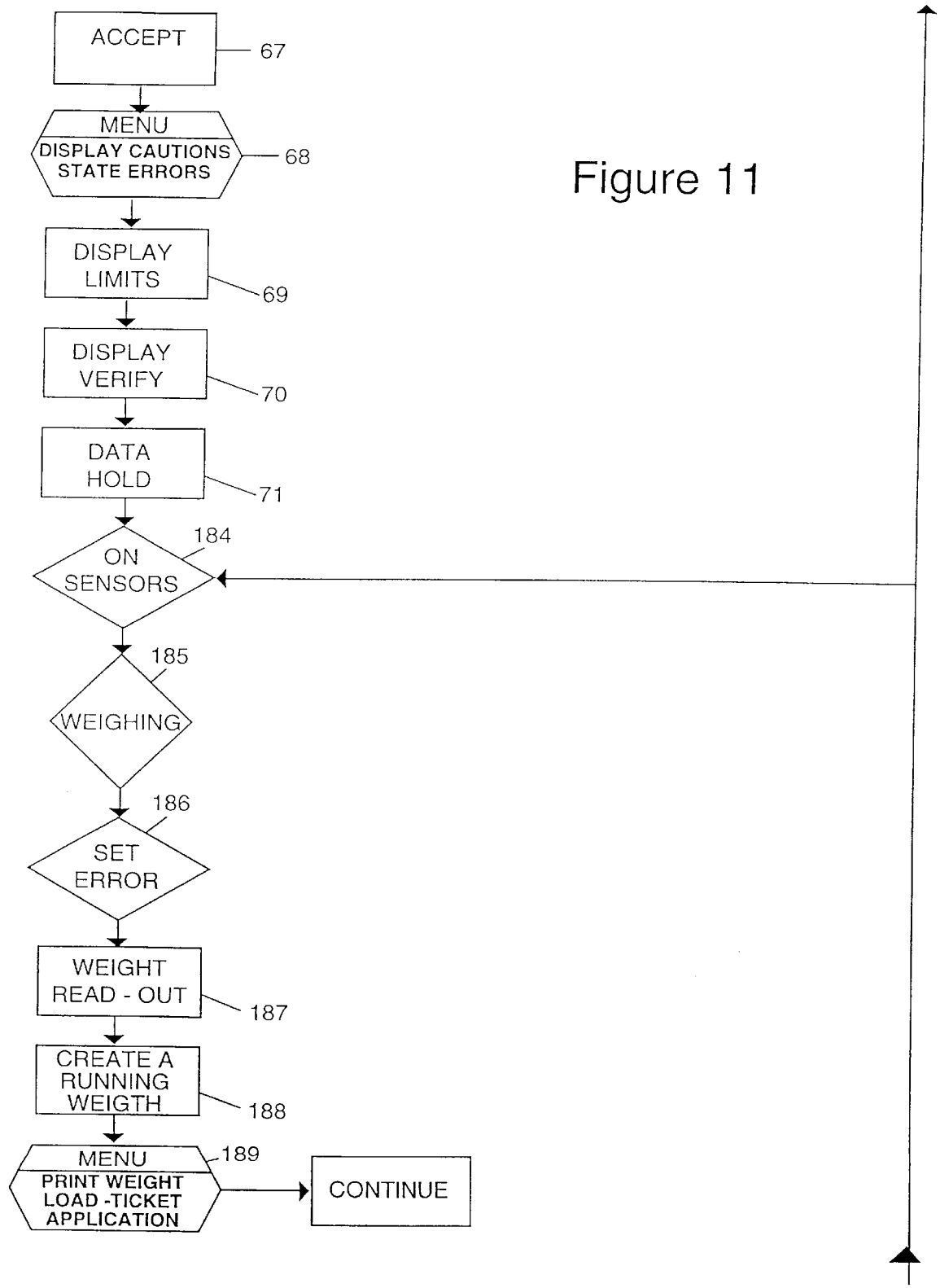
Figure 12:
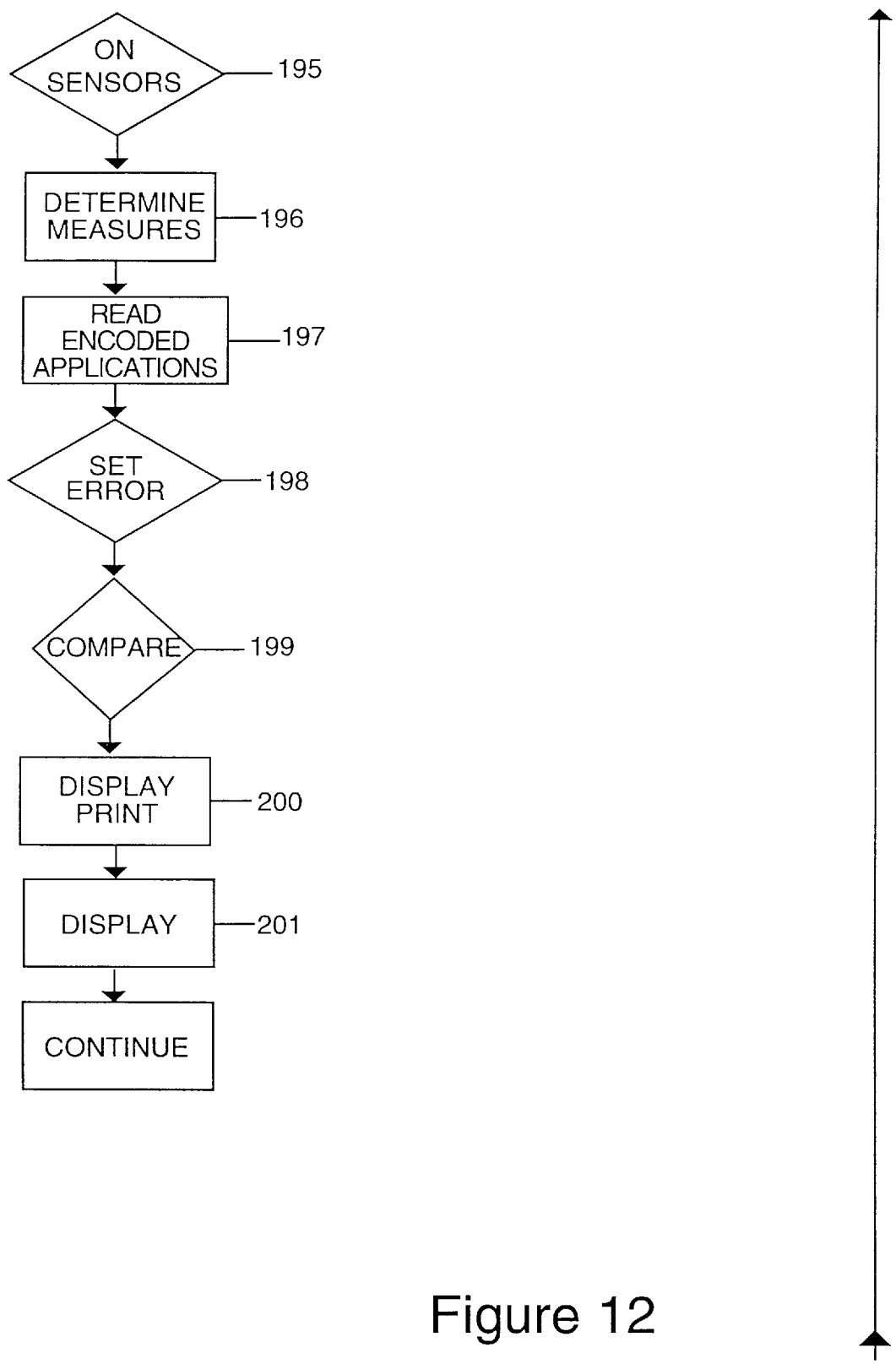
Figure 13:
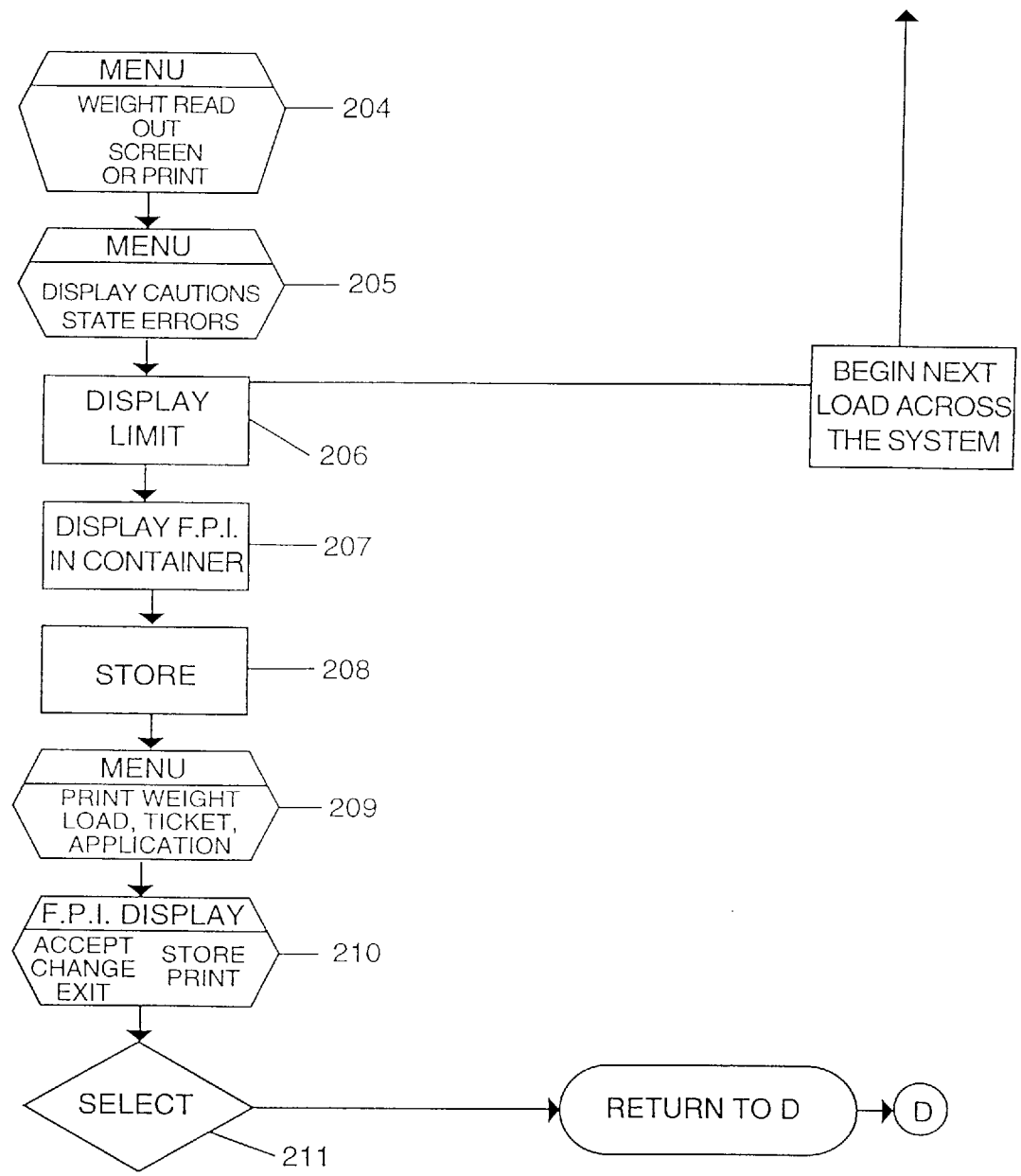

The Federal and State regulations that are required are selected from the menu (144- 146-A). The operator will then choose to continue (150-151) and the Auto F.P.I. (FIG. 10, 114) will engage and read the positions that are used in the bridge weight formula for load position (50-63). After the information inputted is accepted by the operator (FIG. 11, 67) the system will display errors and limits and allow the operator to verify (68-70) and the data will automatically be sent to the computers databases (71) and will be stored for this period.

The operator then proceeds to drive over the scale/sensors. The system will weigh the load (184-189) and designate a number to the load presented. A printed load ticket will be made for the operator to apply to each load taken over the system (188). The scanned dimensions are inputted into the databases (FIG. 12, 195–201) and the dimensions are analyzed.

The operator will then deposit the load on the dock 40 and return to the scale/scanner 20/30 (FIG. 3) and repeat the process until the running weight is at the maximum (FIG. 13, 204-206). A light, on the computer screen, or other means will alert the operator to the nearing of the maximum limit.

The system will rearrange the load items until they have met the correct criteria previously entered or are as near to them as is allowed by the format (207). All databases are in use to conform to the criteria. The operator has a readout (207) from the system that has computed 10 palette loads that have been taken across the scale/scanner system and will be loaded into the container/trailer, and the computer has used the running size and weight totals and indicated that for this sized trailer no more freight should be loaded. The computer has stored the FPI (208) and will print out the FPI 100 displayed in the trailer (209). The operator has saved this display (210) and can elect to start a new trailer load (211).

The computer 50 has arranged the load to be balanced and not to exceed the legal limits. Computer generated printed applications have been applied to each unit of the load by the operator, or automatically applied by a unit that is located on the forklift which prints information sent from the computer system. The operator now has ten palette loads with computer generated labels which are individually marked, i.e. ZZ-1 to ZZ-10 that each correspond with a print out or screen reading that the operator can refer to (194, 209).

As illustrated in FIG. 7, load ZZ-10 has a weight of 8,500 lb. and is to be placed under the bright red section of the application corresponding to nos. 1 thru 3 on the FPI placement. Placement was determined by the computer which places units or pallets due to considerations of weight and compliance with state and federal regulations.

FIG. 7 shows load ZZ-9 which has a weight of 8,500 lb. under the next warm red zone corresponding to nos. 4–6 on the FPI. This is due to the fact the program has determined that this pallet is one of the heaviest pallets, and placement of the load over the pin position helps to meet state and federal regulations. The two loads have a total weight of 17,000 lb. The next loads to be placed by the operator are ZZ-8, ZZ-2, ZZ-4, ZZ-3 and ZZ-1, all of which weigh 4,000 lbs. and they are to be loaded exactly as the print out has stated. Load ZZ-8 is placed under the red-orange zone (7-9 on the FPI), and load ZZ-2 is placed under the orange zone (10-12 on the FPI). Load ZZ-4 is placed under the bright orange zone (13-15 on the FPI). Load ZZ-3 is placed under the orange-blue zone (16-18 on the FPI). Load ZZ-1 is placed under the blue zone (19-21 on the FPI). Load ZZ-5 which weighs 4,000 lb. is placed under the blue-green zone (22-24 on the FPI).

Load ZZ-7 which weighs 8,500 lb. is placed under the green zone (25-27 on the FPI). Load ZZ-6 which weighs 8,500 lb. is placed under the bright green zone (28-30 on the FPI). The ZZ-7 and ZZ-6 loads are placed over the trailer axles and the total of these are 17,000 lbs.

The heaviest portions of this load are placed over both axles and the other containers are distributed in a balanced fashion, and located in this arrangement so that the load doesn't shift. Since the load is to be unloaded at just one location the placement of the loads do not have to be set up for the easiest off loading while keeping to the regulations.

If loads are to be taken off at different locations, the loading operator or driver can use the Freight Placement Index to indicate where on the trailer the load is located in accordance with a very specific identification site. By identifying the start and end position of multiple consignments using the system the operator will have a print out or screen to refer to. The marked pallets, units or loads with the numbers or markings that the computer or operator placed on the loads is coordinated with the printout. The load has been determined for the correct placements for off-loading of the load by the computer 50. If marked with color or numbers or otherwise indicated, the driver can easily see and locate the load and determine the order of off loading.

The computer 50 will compute the locations of the loads in the same manner that the example load was computed in order to meet the regulations the operator has chosen and must comply with. The load may consist of ten pallets going to different destinations. Each of the pallets can be of various sizes and weights. The computer 50 in this example will have to compute the weight placed on each axle in order to coincide with the State and Federal regulations and the most logical procedure for the drop off sites. The computer will exchange numerous placements of the pallets and recalculate the weights applied to the axles until the regulations are met.

In another example, the operator has used the system from step 1 to 10. The trailer specifications were entered in Step #4, and the trailer is 30 ft long, has 2 axles, is 8 ft. wide and the pin position, etc., have been sensed. The tractor has a card that was read in step number 4. The tractor has 3 axles, weighs 12,000 lbs. and is 21 ft. long. Considerations for position of axles, number of axles, etc., has been considered.

In Step Number 7 four different drop-off points were designated on the map of destinations. The program has numbered each of the pallets from 1AA to 10AA. The identification markings are put on the pallet units.

The printout has:

LAST OFF: Loads 2AA and 6AA which weigh 9000 lb. each to be located in the red zone (no. 1-6 on the FPI), because of the weight and shape of the containers (total weight 18,000 lb., each 3 ft. long, 6 ft. wide and 7 ft. tall), and because these loads are to be unloaded at the last destination.

FIFTH OFF: Load 1AA (wt. 3,000 total and 1½ ft long 3 ft. wide and 7 ft. tall) would be placed in the orange zone (no. 7-9 on the FPI). Load 1AA is placed in this location because of the destination, size and weight.

FOURTH OFF: Loads 4AA, 7AA, 8AA, (wt. 5,000, 4000, 6000 lb., respectively, and total wt.=15,000 lb. and respective lengths of 4 ft., 5 ft., 3 ft.=9 ft. total length and each with a 6 ft. width and a height of 5 ft.) all have the same destination and would be placed in the blue zone (no. 10-18 on the FPI) in the receptacle, due to destination and weight considerations.

THIRD OFF: Load 5AA (wt 8,000 lb., 3 ft. length and 5 ft. width) will be loaded over the axles on the FPI (no. 23-25) because the weight is heavier and it is easier to be in compliance with the weight regulations if the heavier weight is placed over the axle.

SECOND OFF: Load 3AA (wt. 10,000, length 6 ft. and 5 ft wide) is loaded into the receptacle in the green zone (no. 25-30 on the FPI).

FIRST OFF: Loads 10AA, 9AA (wt. 3,000 and 3000 lb each, total 6,000 lbs., length 2 ft. each and width 7 ft.) would then be placed in the green zone (no. 19-22 on the FPI) in the trailer due to off loading. In this arrangement the amount of units and pallets to be off-loaded and reloaded to gain access to a unit or pallet behind it is reduced, thereby saving time, money and damage to the cargo.

To make loading easier for the operator working inside of the trailer or container a portable mode of communication could be used to communicate between the operator and a central computer system (i.e., a readout or a portable keyboard or monitor). This way, changes can be readily made. Voice input could also be utilized.

If the operator does not use the scale or the computer and only wishes to use the Freight Placement Index, he can use the markings of the Freight Placement Index to help position loads. The Freight Placement Index is useful by itself because it indicates where the pin point, midpoints or axle points are located. Because axles are being moved on trailers, the Freight Placement Index can assist the operator in determining where the axle ranges are located in each trailer. Accordingly, compliance with the weight restrictions can be met by placing the heaviest loads over the axles.

The FPI will also provide the operator with an indicator of the total cubic feet of the container or trailer, as some operators load a variety of sized trailers in a day and this is an easy reminder of which size trailer they are loading. It will also indicate areas of weight limitations. Since axles can be moved and absent a Freight Placement Index the operator must literally look on the outside of the container in order to determine the axle positions and to visually locate the correct areas to place heavy loads.

Another advantage is that the Freight Placement Index provides visual reference points that the operator can use to find and locate pallets, etc., when a variety of cargo are loaded and off loaded in many different places. Other markings such as the pin point and numerous other items can be listed to help provide instant reference for faster and easier loading.

Furthermore, the freight placement index can be used for training or staging purposes. In a staging procedure the freight placement index can be placed on the floor of a loading dock staging area. The cargo can then be placed along the freight placement index and arranged in an order to be placed in the cargo vessel.

Container or trailer owners could have their logo, trademark or other information printed on the FPI for the operators use or referral.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A freight placement index located on a cargo trailer having a pin and at least one axle, said freight placement index comprising on a support:

a plurality of incremental positioning indicia designating intervals at a predetermined distance;

a first identifier for indicating a position of said pin of said cargo trailer; and at least one second identifier for designating a location of said at least one axle of said cargo trailer;

said freight placement index being about the same length as said cargo trailer and being positioned on said cargo trailer.

2. The freight placement index according to claim 1, wherein said index is for placement on an inside of said cargo trailer.

3. The freight placement index according to claim 1, wherein the freight placement index further comprises means for adhering said index to said cargo trailer.

4. The freight placement index according to claim 1, further including a plurality of color designations for indicating predetermined portions of said trailer.

5. The freight placement index according to claim 4, wherein each of said plurality of color designations include varying tones of said color.

6. The freight placement index according to claim 1, further including indicia for indicating the ¼, ½ and ¾ positions of a trailer length.

7. The freight placement index according to claim 1, further including indicia for indicating a midpoint between said pin and said at least on axle.

8. A freight placement index located within a predetermined boundary having a length and a width, the index comprising on a support:
 a plurality of incremental positioning indicia designating intervals at a predetermined distance;
 a first identifier for indicating a midpoint within said predetermined boundary; and
 a plurality of color identifiers for designating a plurality of locations within said predetermined boundary;
 said freight placement index being about the same length as the length of said predetermined boundary and being positioned within said predetermined boundary.

9. The freight placement index according to claim 8, wherein the freight placement index further comprises means for adhering said index to within said predetermined boundary.

10. The freight placement index of claim 8, wherein said freight placement index is placed in a vessel on one of a floor of the vessel, a wall of the vessel or a ceiling of the vessel.

11. The freight placement index of claim 8, further comprising, one quarter and three quarters distance identifiers.

12. The freight placement index of claim 8, wherein said index is within a cargo vessel used for transporting cargo on one of a ship, a train and a truck.

13. The freight placement index of claim 8, wherein the boundary is generally rectangular and the color identifiers extend transversely between two edges of the boundary, the incremental positioning indicia extending longitudinally between the two other edges of the boundary such that the incremental positioning indicia and the color identifiers are perpendicularly oriented relative to one another.

14. The freight placement index of claim 8, wherein said index is on a loading dock and wherein the boundary is rectangular to simulate a cargo vessel such that the freight placement index is usable for prestaging cargo prior to loading the cargo into a cargo vessel and for training operators to load the cargo into a cargo vessel.

15. A freight placement index located on a truck having at least one axle, or located on a container capable of being loaded and transported by a vehicle having at least one axle, said freight placement index comprising on a support:
 a plurality of incremental positioning indicia designating intervals at a predetermined distance; and
 at least one identifier for designating a location of said at least one axle of said truck or said at least one axle of said vehicle for transporting said container;
 said freight placement index being about the same length as said truck or said container and being positioned on said truck or said container.

16. The freight placement index according to claim 15, further including a plurality of color designations for indicating predetermined portions of said truck or container.

17. The freight placement index according to claim 16, wherein each of said plurality of color designations include varying tones of said color.

18. The freight placement index according to claim 15, further including indicia for indicating the ¼, ½ and ¾ positions of a truck or container length.

19. The freight placement index according to claim 15, wherein the freight placement index further comprises means for adhering said index to said truck or said container.

* * * * *